(12) United States Patent
Ortega et al.

(10) Patent No.: US 8,855,011 B2
(45) Date of Patent: Oct. 7, 2014

(54) DISTRIBUTED TRANSFORMS FOR EFFICIENT DATA GATHERING IN SENSOR NETWORKS

(75) Inventors: Antonio Ortega, Los Angeles, CA (US); Sunil K. Narang, Los Angeles, CA (US); Godwin Shen, Pasadena, CA (US); Javier Perez-Trufero, Palma de Mallorca (ES)

(73) Assignee: University of Southern California, Los Angeles, CA (US)

( * ) Notice: Subject to any disclaimer, the term of this patent is extended or adjusted under 35 U.S.C. 154(b) by 115 days.

(21) Appl. No.: 13/181,493

(22) Filed: Jul. 12, 2011

(65) Prior Publication Data
US 2012/0014289 A1 Jan. 19, 2012

Related U.S. Application Data

(60) Provisional application No. 61/363,592, filed on Jul. 12, 2010.

(51) Int. Cl.
| | |
|---|---|
| *H04L 12/28* | (2006.01) |
| *H04W 52/32* | (2009.01) |
| *H04W 52/36* | (2009.01) |
| *H04W 52/04* | (2009.01) |
| *H04W 28/06* | (2009.01) |
| *H04W 84/18* | (2009.01) |

(52) U.S. Cl.
CPC ............ *H04W 52/04* (2013.01); *H04W 52/325* (2013.01); *H04W 52/367* (2013.01); *H04W 28/06* (2013.01); *H04W 84/18* (2013.01)
USPC ............................ 370/254; 370/255; 370/328

(58) Field of Classification Search
None
See application file for complete search history.

(56) References Cited

U.S. PATENT DOCUMENTS

| | | | |
|---|---|---|---|
| 5,568,142 | A | 10/1996 | Velazquez et al. |
| 5,995,539 | A | 11/1999 | Miller |
| 6,038,579 | A | 3/2000 | Sekine |
| 6,208,247 | B1 | 3/2001 | Agre et al. |
| 6,278,753 | B1 | 8/2001 | Suarez et al. |
| 6,523,051 | B1 | 2/2003 | Majani et al. |

(Continued)

OTHER PUBLICATIONS

Acimovic et al., "Adaptive distributed algorithms for power-efficient data gathering in sensor networks," Intl. Conf on Wireless Networks, Comm. and Mobile Computing, vol. 2, pp. 946-951, Jun. 2005.

(Continued)

*Primary Examiner* — Robert Wilson
(74) *Attorney, Agent, or Firm* — Fish & Richardson P.C.

(57) ABSTRACT

Devices, systems, and techniques for data collecting network such as wireless sensors are disclosed. A described technique includes detecting one or more remote nodes included in the wireless sensor network using a local power level that controls a radio range of the local node. The technique includes transmitting a local outdegree. The local outdegree can be based on a quantity of the one or more remote nodes. The technique includes receiving one or more remote outdegrees from the one or more remote nodes. The technique includes determining a local node type of the local node based on detecting a node type of the one or more remote nodes, using the one or more remote outdegrees, and using the local outdegree. The technique includes adjusting characteristics, including an energy usage characteristic and a data compression characteristic, of the wireless sensor network by selectively modifying the local power level and selectively changing the local node type.

20 Claims, 18 Drawing Sheets

(56) References Cited

U.S. PATENT DOCUMENTS

| | | | |
|---|---|---|---|
| 6,757,343 | B1 | 6/2004 | Ortega et al. |
| 7,715,928 | B1 | 5/2010 | Ciancio et al. |
| 7,920,512 | B2* | 4/2011 | Maltseff et al. ............... 370/328 |
| 8,238,290 | B2* | 8/2012 | Ordentlich et al. ........... 370/328 |
| 2012/0014289 | A1* | 1/2012 | Ortega et al. ................. 370/255 |

OTHER PUBLICATIONS

Akyildiz et al., "On exploiting spatial and temporal correlation in wireless sensor networks," Mar. 2004, in WiOpt'04, pp. 71-80.

Anderson, T.E., D. E. Culler, D. A. Patterson, and the NOW team, "A case for NOW (Networks of Workstations)," Feb. 1995, IEEE Micro, vol. 151, pp. 54-64, 11 pages.

Antonini, M. et al., "Image coding using the wavelet transform," IEEE Trans. Image Proc., vol. 1, No. 1, pp. 205-220, Apr. 1992.

Aysal et al., "Broadcast gossip algorithms," in Information Theory Workshop, 2008. ITW '08, IEEE, May 2008, pp. 343-347.

Beylkin et al., "Fast wavelet transforms and numerical algorithms I," Comm. Pure Appl. Math., vol. 44, No. 2, pp. 141-183, 1991, 44 pages.

Chakrabarti et al., "Efficient realizations of encoders and decoders based on the 2-d discrete wavelet transform," IEEE Transactions on Very Large Scale Integration (VLSI) Systems, vol. 7, No. 3, pp. 289-298, Sep. 1998.

Chakrabarti et al., "Efficient realizations of the discrete and continuous wavelet transforms: From single chip implementations to mappings on SIMD array computers," IEEE Trans. on Signal Proc., vol. 43, No. 3, pp. 759-771, Mar. 1995.

Chakrabarti, C. et al., "Architecture for Wavelet Transforms: A Survey," Nov. 1996, J. VLSI Signal Process. 14 (2): 171-192, 31 pages.

Chong et al., "Sensor networks: Evolution, opportunities, and challenges," Aug. 2003, Proceedings of the IEEE, vol. 91, No. 8, pp. 1247-1256, 10 pages.

Chrysafis et al., "Line based, reduced memory, wavelet image compression," Mar. 30-Apr. 1, 1998, Proceedings of the 1998 Data Compression. Conference (DCC '98), Snowbird, UT, USA, pp. 398-407, 10 pages.

Chrysalis et al., "Line based, reduced memory, wavelet image compression," IEEE Trans. on Image Processing, vol. 9, No. 3, pp. 378-389, May 2000.

Chvatal, V., "A greedy heuristic for the set-covering problem," 1979, Mathematics of Operations Research, vol. 4, pp. 233-235, 4 pages.

Ciancio et al., "Energy-efficient data representation and routing for wireless sensor networks based on a distributed wavelet compression algorithm," IPSN '06, 2006, 4 Pages.

Ciancio et al., "A distributed wavelet compression algorithm for wireless sensor networks using lifting," IEEE International Conference on Acoustics, Speech and Signal Processing (ICASSP'04), Montreal, Canada, May 17-21, 2004, pp. iv-633-iv636.

Ciancio, Alexandre. "Distributed Wavelet Compression Algorithm for Wireless Sensor Networks," Dec. 2006, University of Southern California, Ph.D. Disseration, 134 pages.

Cosman et al. "Memory constrained wavelet-based image coding," IEEE Signal Processing Letters, vo. 5, No. 9, pp. 221-223, Sep. 1998.

Cosman et al., "Image compression for memory constrained printers," Proceedings of the 1998 International Conference on Image Processing, ICIP 98., Oct. 4-7, 1998, Chicago, Illinois, USA, vol. 3, pp. 109-113.

Cristescu et al., "Networked slepian-wolf: theory, algorithms, and scaling laws," Dec. 2005, IEEE Transactions on Information Theory, vol. 51, pp. 4057-4073.

Daubechies, I. and W. Sweldens, "Factoring wavelet transforms into lifting steps," 1998, J. Fourier Anal. Appl., vol. 4, No. 3, pp. 247-269, 26 pages.

Denk, T.C. and K. K. Parhi, "VLSI architectures for lattice structure based orthonormal discrete wavelet transforms," Feb. 1997, IEEE Trans. on Circuit and Systems-II. Analog and Digital Signal Processing, vol. 44, No. 2, pp. 129-132, 4 pages.

Dimakis et al., "Gossip algorithms for distributed signal processing," in In Proceedings of the IEEE, Nov. 2010, vol. 98, pp. 1847-1864.

Fernandez et al., "An input dependent algorithm for the inverse discrete wavelet transform," Conference Record of the Thirty-Second Asilomar Conference on Signals, Systems & Computers, Pacific Grove, CA, USA, Nov. 1-4. 1998, vol. 1, pp. 472-476.

Fridman et al., "On the scalability of 2-D discrete wavelet transform alogrithms," 1997, Multidimensional Systems and Signal Processing, 8: 185-218, 33 pages.

Fridman et al. "Discrete wavelet transform: Data dependence analysis and synthesis of distributed memory and control array architectures," May 1997, IEEE Trans. on Signal Processing, vol. 45, No. 5, pp. 1291-1308, 18 pages.

Gastpar et al., "The distributed Karhunen-Loève Transform," Dec. 9-11, 2002, in Proceedings of the 2002 International Workshop on Multimedia Signal Processing, St. Thomas, US Virgin Islands, pp. 57-60, 4 pages.

Guo, H., "Mapped inverse discrete wavelet transform for data compression," Proceedings of the 1998 IEEE International Conference on Acoustics, Speech and Signal Processing (ICASSP), Seattle, WA, USA, May 12-15, 1998, vol. 3, pp. 1385-1388.

Hac et al., "Wireless Sensor Network Designs" Dec. 12, 2003 John Wiley & Sons, ISBN: 0-470-86736-1, pp. 1-391.

Heinzelman et al., "Energy-efficient routing protocols for wireless microsensor networks," in Proc. of Hawaii Intl. Conf. on Sys. Sciences, Jan. 2000, pp. 10.

Jain et al., "Data clustering: A review," Sep. 1999, ACM Computing Surveys, vol. 31, No. 3, pp. 264-323.

Jia et al., "An efficient distributed algorithm for constructing small dominating sets.," in PODC, 2001, pp. 33-42.

Jiang et al., "Efficient Discrete Wavelet Transform Architectures based on Filterbank Factorizations", Proceedings of the IEEE 1999 International Conference on Image Processing, (ICIP 99), Oct. 24-28, 1999, Kobe, Japan, vol. 2, pp. 749-753.

Jiang et al., "Lifting factorization-based discrete wavelet transform architecture design," May 2001, IEEE Transactions on Circuits and Systems for Video Technology, vol. 11, No. 5, pp. 651-657, 7 pages.

Jiang et al., "Parallel Architecture for the Discrete Wavelet Transform based on the Lifting Factorization", Jul. 7, 1999, Proc. SPIE, vol. 3817, pp. 1-13, 13 pages.

Kalapala et al., "Hybrid evolutionary algorithms on minimum vertex cover for random graphs," 2007, Tech. Rep. MEDAL Report No. 2007004, University of Missouri-St.Louis, pp. 17.

Kuhn et al., "Constant-time distributed dominating set approximation," Jul. 2003, in ACM Symposium on Principles of Distributed Computing (PODC), pp. 8.

Kuhn et al., "The price of being near-sighted," 2006, In SODA 06: Proceedings of the seventeenth annual ACM-SIAM symposium on Discrete algorithm, pp. 980-989, ACM.

Kusuma, J. et al., "Distributed compression for sensor networks," Proceedings of the IEEE 2001 International Conference on Image Processing, Piscataway, NJ, USA, 2001, pp. 82-85 2001.

Lafruit, G. et al., "Optimal memory organization for scalable texture codecs in MPEG-4," Mar. 1999, IEEE Transactions on Circuits and Systems for Video Technology, vol. 9, No. 2, pp. 218-243, 26 pages.

Lewis et al., "VLSI architecture for 2-D Daubechies wavelet transform without multipliers," Electronic Letters, vol. 27, No. 2, pp. 171-173, Jan. 17, 1991.

Li et al., "Detection, classification and tracking of targets in distributed sensor networks," IEEE Signal Processing Magazine, vol. 19, No. 2, pp. 17-29, Mar. 2002.

Lian, C. et al., "Lifting based discrete wavelet transform architecture for JPEG2000," May 6-9, 2001, The 2001 IEEE International Symposium on Circuits and Systems (ISCAS), vol. 2, pp. 445-448, 4 pages.

Lindsey et al., "PEGASIS: Power-Efficient Gathering in Sensor Information Systems," Proceedings of the IEEE Aerospace Conference, Los Angeles, USA, 2002, vol. 2, pp. 3-1125-3-1130.

Mallat, S. "A theory for multiresolution signal decomposition: The wavelet representation," IEEE Transactions on Pattern Analysis and Machine Intelligence, vol. 11, No. 7, pp. 674-693, Jul. 1989.

Marino, F. et al., "A parallel implementation of the 2-D discrete wavelet transform without interprocessor communication," Nov. 1999, IEEE Transactions on Signal Processing, vol. 47, No. 11, pp. 3179-3184, 6 pages.

(56) References Cited

OTHER PUBLICATIONS

Marshall, T.G. "Zero-Phase Filter Bank and Wavelet Code r Matrices: Properties, Triangular Decompositions, and a Fast Algorithm," 1997, Multidimensional Systems and Signal Processing, 8: 71-88, 18 pages.

Martina, M. et al., "Embedded IWT Evaluation in Reconfigurable Wireless Sensor Network," 9th International Conference on Electronics, Circuits and Systems, 2002, vol. 3, Sep. 15-18, 2002 pp. 855-858.

Martina, M., et al., "Energy Evaluation on a Reconfigurable Multimedia-Oriented Wireless Sensor," 2002, pp. 332-339, Springer-Verlag Berlin Heidelberg.

Mavinkurve et al., "Mip3s: Algorithms for power-conserving multicasting in static wireless ad hoc networks," in ICON'03, 2003, pp. 143-148.

Misra et al., "Parallel computation of 2-D wavelet transforms," Proceedings of the 11th IAPR International Conference on Pattern Recognition, 1992., vol. IV. Conference D: Architectures for Vision and Pattern Recognition, The Hague, Netherlands, Aug. 30-Sep. 3, 1992, pp. 111-114.

Mou et al., "Short-length FIR filters and their use in fast nonrecursive filtering," Jun. 1991, IEEE Transactions on Signal Processing, vol. 39, No. 6, pp. 1322-1332, 11 pages.

Narang et al., "Lifting based wavelet transforms on graphs," 2009, APSIPA Annual Summit and Conference (APSIPA ASC' 09).

Narang et al., "Local two-channel critically sampled filter-banks on graphs," Sep. 2010, ICIP' 10, pp. 333-336.

Narang et al., "Unidirectional graphbased wavelet transforms for efficient data gathering in sensor networks," Mar. 2010, 35th International Conference on Acoustics, Speech, and Signal Processing (ICASSP).

Nielsen et al., "TR-CS-97-21: A Scalable Parallel 2D Wavelet Transform Algorithm," Dec. 1997, Technical Report TR-CS-97-21, Joint Computer Science Technical Report Series, The Australian National University, 16 pages.

Ortega, A., et al., "Implementations of the discrete wavelet transform: complexity, memory, and parallelization issues," Jul. 1999, SPIE Conference on Wavelet Application in Signal and Image Processing VII, vol. 3813, pp. 386-400, 15 pages.

Parhi, K.K. and T. Nishitani, "VLSI architectures for discrete wavelet transforms," IEEE Transactions on Very Large Scale Integration (VLSI) Systems, vol. 1, No. 2, pp. 191-202, Jun. 1993.

Pattem, S. et al., "Senzip: An architecture for distributed en-route compression in wireless sensor networks," Apr. 2009, in ESSA, pp. 8.

Pattem, S. et al., "The Impact of Spatial Correlation on Routing with Compression in Wireless Sensor Networks," Apr. 26-27, 2004, Proceedings of the Third International Symposium on Information Processing in Sensor Networks (IPSN 2004), pp. 28-35, 8 pages.

Pattem, S. et al., "The Impact of Spatial Correlation on Routing with Compression in Wireless Sensor Networks," Aug. 2008, AMC Transactions on Sensor Networks, 4(4):60-66.

Pottie et al., "Wireless integrated network sensors," (May 2000, Communication of the ACM, vol. 43, Issue 5, pp. 51-58.

Pradhan, S.S. et al., "Distributed compression in a dense microsensor network," Mar. 2002, IEEE Signal Processing Magazine, pp. 51-60, 10 pages.

Rabbat et al., "Distributed optimization in sensor networks," 2004, IPSN'04, pp. 8.

Rioul, O. and P. Duhamel, "Fast algorithms for discrete and continuous wavelet transforms," IEEE Trans. on Information Theory, vol. 38, No. 2, pp. 569-586, Mar. 1992.

Sava, H. et al., "Parallel pipeline implementation of wavelet transform," IEEE Proceedings on Vision, Image and Signal Processing, vol. 144, No. 6, pp. 355-359, Dec. 1997.

Scaglione, A. and S. D. Servetto, "On the interdependence of routing and data compression in multi-hop networks", Sep. 23-28, 2002, International Conference on Mobile Computing and Networking—MOBICOM'02, 2002, Atlanta, GA,USA, 24 pages.

Schneider et al., "A log-star distributed maximal independent set algorithm for growth-bounded graphs," Aug. 18-21, 2009, in PODC'08, pp. 35-44, 10 pages.

Servetto, Sergio D. "Distributed signal processing algorithms for the sensor broadcast problem," Mar. 12-14, 2003, Conference on Information Science and Systems, The John Hopkins University, 6 pages.

Servetto, Sergio. D. "Sensing lena—massively distributed compression of sensor images," Sep. 14-17, 2003, ICP—International Conference on Image Compression, Sep. 2003 Proceedings of the 2003 International Conference on Image Processing (ICIP 2003), vol. 1, pp. 1-613-1-616, 4 pages.

Shen et al., "Adaptive distributed transforms for irregularly sampled wireless sensor networks," 2009, ICASSP '09, vol. 0, pp. 2225-2228, 4 pages.

Shen et al., "Energy-efficient graphbased wavelets for distributed coding in wireless sensor networks," 2009, ICASSP' 09, vol. 0, pp. 2253-2256.

Shen et al., "Optimized distributed 2D transforms for irregularly sampled sensor network grids using wavelet lifting," in Proc. of ICASSP'08, Apr. 2008, pp. 4.

Shen et al., "Transform-based distributed data gathering," Sep. 2009, To Appear in IEEE Transactions on Signal Processing, pre-print from arXiv:0909.5177.

Sohrabi et al., "Protocols for self-organization of a wireless sensor network," Oct. 2000, IEEE, Personal Comm., 7(5), pp. 12.

Sridharan et al., "Max-min fair collision-free scheduling for wireless sensor networks," Apr. 2004, in Proc. of IEEE IPCCC Workshop on Multi-hop Wireless Networks, 6 pages.

Sweldens, "The lifting scheme: A construction of second generation wavelets," 1995, Technical report 1995:6, Industrial Mathematics Initiative, Department of Mathematics, University of South Carolina, (ftp://ftp.math.sc.edu/pub/imi 95/imi95 6.ps), pp. 36.

Sweldens, W., "The lifting scheme: A construction of second generation wavelets," Mar. 1998, SIAM J. Math. Anal. 29(2): 511-546, 36 pages.

Sweldens, W., "The lifting scheme: A new philosophy in biorthogonal wavelet constructions," 1995, Wavelet Applications III, A. Lame and M. Unser, Eds., Proc. SPIE, San Diego, CA vol. 2569, pp. 68-79, 12 pages.

Taubman, D. "Adaptive non-separable lifting transforms for image compression," Proceedings of the 1999 International Conference on Image Processing (ICIP 99), Kobe, Japan, Oct. 24-28, 1999, pp. 772-776.

TinyOS-2, "Collection tree protocol," Jul. 2007, http://www.tinyos.net/tinyos-2.x/doc/, pp. 2.

Trenas, M.A. et al., "A memory system supporting the efficient SIMD computation of the two dimension al DWT," May 12-15, 1998, Proceedings of the 1998 IEEE International Conference on Acoustics, Speech and Signal Processing, (ICASSP 1998), pp. 1521-1524, 4 pages.

Vaidyanathan, P.P. and P.-Q. Hoang, "Lattice structures for optimal design and robust implementation of two-channel perfect-reconstruction QMF banks," IEEE Transactions on Acoustics, Speech, and Signal Processing, vol. 36, No. 1, pp. 81-94, Jan. 1988.

Vaidyanathan, P.P.,"Multirate digital filters, filter banks, polyphase networks, and applications: A tutorial," Proceedings of the IEEE, vol. 78, No. 1, pp. 56-93, Jan. 1990.

Van Dyck et al., "Wavelet video coding with ladder structures and entropy-constrained quantization," IEEE Transactions on Circuits and Systems for Video Technology, vol. 6, No. 5, pp. 483-495, Oct. 1996.

Vetterli et al., "Perfect reconstruction FIR filter banks: Some properties and factorizations," Jul. 1989, IEEE Transactions on Acoustic, Speech and Signal Processing, vol. 37, No. 7, pp. 1057-1071, 15 pages.

Vishwanath, M. "The recursive pyramid algorithm for the discrete wavelet transform," IEEE Transactions on Signal Processing, vol. 42, No. 3, pp. 673-676, Mar. 1994.

Wagner et al., "An architecture for distributed wavelet analysis and processing in sensor networks," Apr. 19-21, 2006, in IPSN '06, pp. 243-250, 8 pages.

(56) References Cited

OTHER PUBLICATIONS

Wagner et al., "Distributed wavelet de-noising for sensor networks," in Decision and Control, Dec. 2006, 45th IEEE Conference, pp. 373-379, 7 pages.

Wagner et al., "Distributed wavelet transform for irregular sensor network grids," in IEEE Stat. Sig. Proc. Workshop (SSP), Jul. 2005, 6 pages.

Wang et al., "Energy-efficient DSPs for wireless sensor networks," Signal Processing Magazine, IEEE vol. 19, Issue 4, pp. 68-78, Jul. 2002.

Yang et al. "Coarse-Grained Parallel Algorithms for Multi-Dimensional Wavelet Transforms," 1998, The Journal of Supercomputing, vol. 12, pp. 99-118, 20 pages.

Yang et al., "Coarse-grained parallel algorithms for multi-dimensional wavelet transforms," 1997, The Journal of Supercomputing, vol. 11, pp. 1-22, 22 pages.

Yang et al., "Parallel wavelet transforms for image processing," in ASAE Worlcshop on Application of Parallel Processing for Image Processing, Aug. 1997, 17 pages.

\* cited by examiner

| Algorithm | Distributed Heuristic for Minimum Set Cover |
|---|---|
| 1: | Broadcast a pilot signal adding the power level used as information. |
| 2: | Run a timeout and listen to all neighbor's pilot signals. |
| 3: | Broadcast an ACK message at the maximum power of all received pilots. |
| 4: | Outdegree = Number of ACK's received. |
| 5: | Broadcast Outdegree. |
| 6: | Receive neighbor's outdegree. |
| 7: | while still unassigned do |
| 8: |   Run a random timeout. |
| 9: |   while timeout > 0 do |
| 10: |     Listen to decisions of neighbors. |
| 11: |     if One neighbor becomes raw data node then |
| 12: |       Stop timeout |
| 13: |       Become aggregating node |
| 14: |       Broadcast decision |
| 15: |     end if |
| 16: |   end while |
| 17: |   if There are still unassigned neighbors then |
| 18: |     if Outdegree ≥ Unassigned neighbor's outdegree then |
| 19: |       Become raw data node. |
| 20: |       Broadcast decision. |
| 21: |     else |
| 22: |       Restart timeout. |
| 23: |     end if |
| 24: |   else |
| 25: |     *All neighbors are Aggregating Nodes* |
| 26: |     Become raw data node. |
| 27: |     Broadcast decision. |
| 28: |   end if |
| 29: | end while |

*Fig. 5*

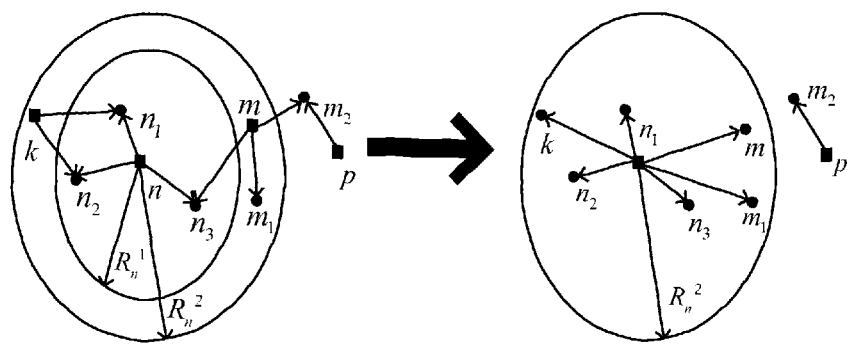
Fig. 6A  Fig. 6B
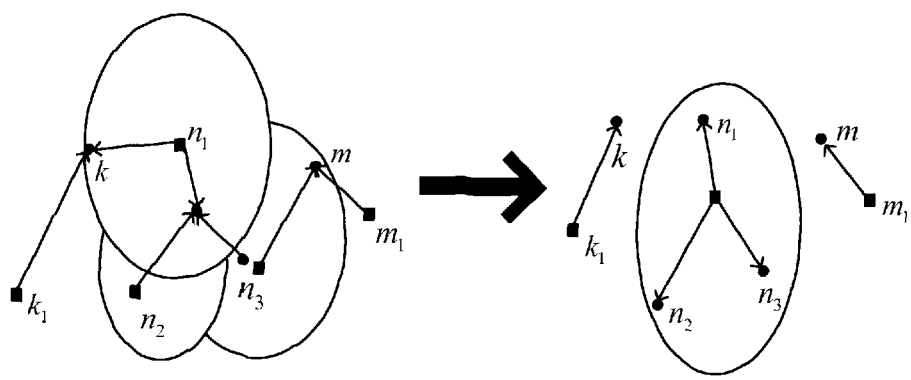
Fig. 6C  Fig. 6D

Algorithm Approximation-based Distributed Min Set Cover Modification for raw data nodes 1: Possible Radio Ranges = $[R_m^{min}, R_m^1, ..., R_{max}]$
2: Run random timeout
3: while Timeout > 0 do
4:    Listen if some other neighbor wants to cover you.
5:    if Request for being covered received then
6:       Ask Aggregating neighbors if they are covered by someone else
7:       if All Aggregating neighbors are covered by some other raw data node then
8:          Send ACK
9:       else
10:         Send NACK
11:         Restart Timeout
12:       end if
13:    end if
14:    if CONFIRMATION received then
15:       Change parity to Aggregating Node
16:    end if
17: end while
18: $\delta_{max} = 0$
19: $\hat{R}_m = R_m^{min}$
20: for $R_m = R_m^1$ to $R_{max}$ do
21:    Send pilot signal at power level $R_m^2$
22:    if All raw nodes in $\hat{\mathcal{D}}_m$ accept being covered then
23:       Calculate $\hat{C}_1$ and $\hat{C}_2$ :
24:          $\hat{C}_1 = B_r(R_m^2 + g(\rho(m))) + B_r |\hat{\mathcal{D}}_m| g(m)$
25:          $\hat{C}_2 = B_r(\hat{R}_m^2 + g(\rho(m))) + cB_r |\hat{\mathcal{D}}_m| g(m)$
26:          $\delta_i = \hat{C}_1 - \hat{C}_2$
27:       if $\delta_i > \delta_{max}$ then
28:          $\delta_{max} = \delta_i$
29:          $\hat{R}_m = R_m$
30:       end if
31:    end if
32: end for
33: if $\hat{R}_m \neq R_m^{min}$ then
34:    Send CONFIRMATION at power level $\hat{R}_m^2$
35:    Fix Radio Range at $\hat{R}_m$
36:    Update parent in the tree
37: end if

*Fig. 7*

Algorithm Approximation-based Distributed Min Set Cover Modification for aggregating nodes 1: Possible Radio Ranges = $[R_m^{min}, R_m^1, ..., R_{max}]$
2: Run random timeout
3: while Timeout > 0 do
4:    Listen if a new raw data node wants to cover you.
5:    if Pilot signal received then
6:       Update number of raw data nodes that cover you.
7:    end if
8:    Listen if any of your current raw data nodes request permission for changing its parity.
9:    if Request received then
10:      if Covered by more raw nodes that the ones who have sent the request then
11:         Send ACK
12:         Update number of raw data nodes that cover you.
13:      end if
14:    end if
15: end while
16: $\delta_{max} = 0$ and $\hat{R}_m = R_m^{min}$
17: for $R_m = R_m^1$ to $R_{max}$ do
18:    Send Request at power level $R_m^2$
19:    if All raw nodes in $\hat{D}_m$ accept being covered then
20:       Calculate $\hat{C}_3$ and $\hat{C}_4$:
21:       $\hat{C}_3 = cB_r(R_m^2 + g(\rho(m))) + B_r|\hat{D}_m|g(m)$
22:       $\hat{C}_4 = B_r(\hat{R}_m^2 + g(\rho(m))) + cB_r|\hat{D}_m|g(m)$
23:       $\delta_i = \hat{C}_3 - \hat{C}_4$
24:       if $\delta_i > \delta_{max}$ then
25:          $\delta_{max} = \delta_i$ and $\hat{R}_m = R_m$
26:       end if
27:    end if
28: end for
29: if $\hat{R}_m \neq R_m^{min}$ then
30:    Send CONFIRMATION at power level $\hat{R}_m^2$
31:    Fix Radio Range at $\hat{R}_m$
32:    Change parity to Raw Data Node.
33:    Update parent in the tree
34: end if

*Fig. 8*

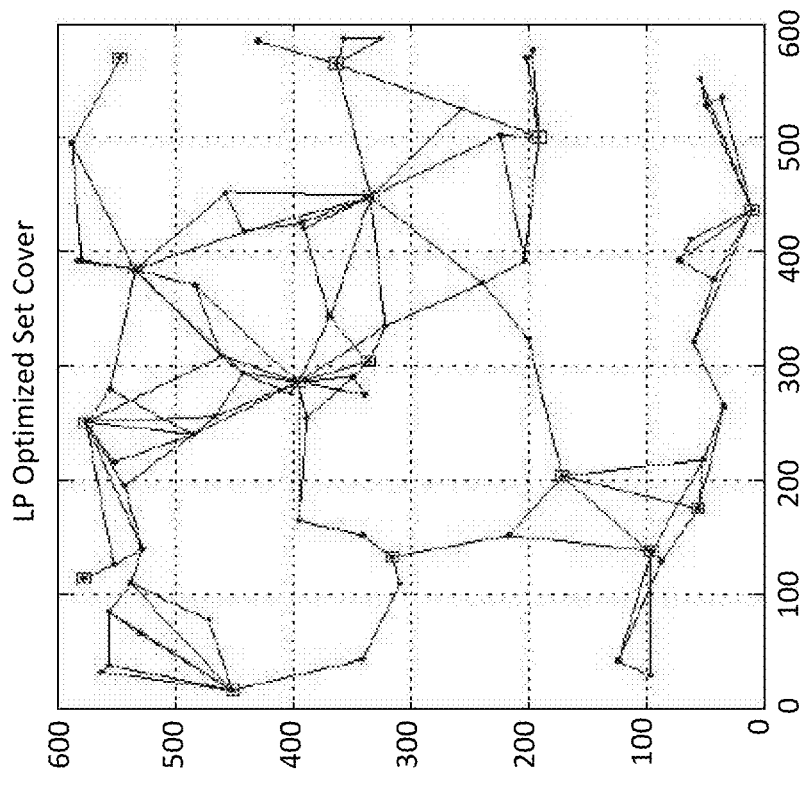
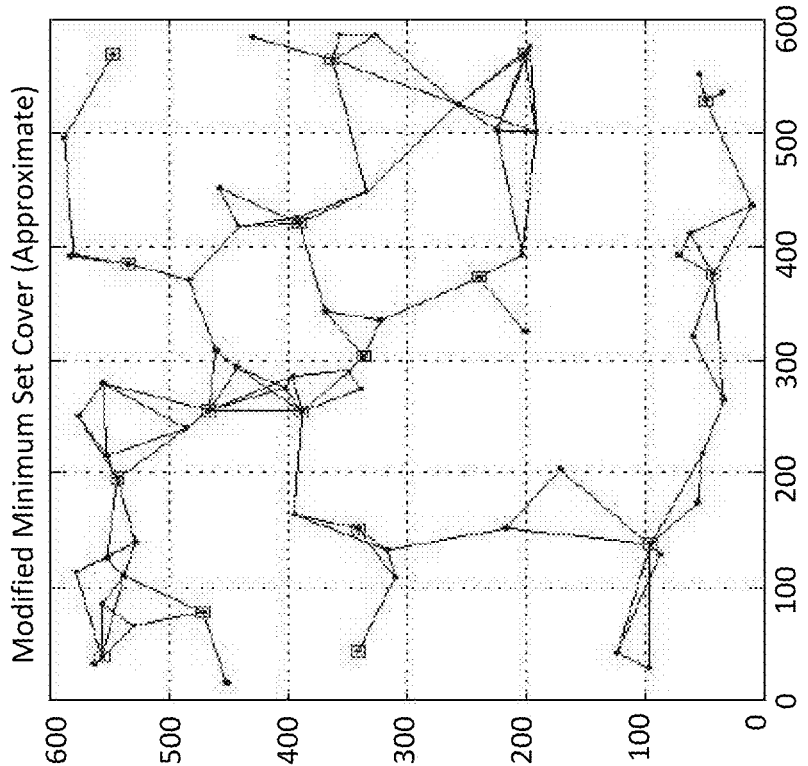
Fig. 9D
Fig. 9C

Algorithm *Greedy Set Cover for Unweighted Directed Graphs.*

Require: $\mathcal{N} = \{n_{[v]}\}_{v \in V}$
1: Initialize $\mathcal{C} = \phi$. Define $f(\mathcal{C}) = |\bigcup_{n_{[v]} \in \mathcal{C}} n_{[v]}|$
2: repeat
3:    Choose $v_j \in V$ maximizing the difference $[f(\mathcal{C} \cup \{n_{[v_j]}\}) - f(\mathcal{C})]$
4:    Let $\mathcal{C} \leftarrow \mathcal{C} \cup \{n_{[v_j]}\}$
5: until $f(\mathcal{C}) == f(\mathcal{N})$
6: return $\mathcal{C}$

*Fig. 12*

Algorithm *Greedy Set Cover for Weighted Vertex Directed Graphs.*

Require: $\mathcal{N} = \{n_{[v]}\}_{v \in V}, \mathcal{W} = \{w_v\}_{v \in V}$
1: Initialize $\mathcal{C} = \phi$. Define $f(\mathcal{C}) = |\bigcup_{n_{[v]} \in \mathcal{C}} n_{[v]}|$
2: repeat
3:    Choose $v_j \in V$ minimizing the cost per element $w_{v_j}/[f(\mathcal{C} \cup \{n_{[v_j]}\}) - f(\mathcal{C})]$
4:    Let $\mathcal{C} \leftarrow \mathcal{C} \cup \{n_{[v_j]}\}$
5: until $f(\mathcal{C}) == f(\mathcal{N})$
6: return $\mathcal{C}$

*Fig. 13*

DISTRIBUTED TRANSFORMS FOR EFFICIENT DATA GATHERING IN SENSOR NETWORKS

PRIORITY CLAIM

This patent document claims the benefit of the U.S. provisional application No. 61/363,592 entitled "Efficient Communications and Data Compression Algorithms in Sensor Networks Using Discrete Wavelet Transform" and filed on Jul. 12, 2010, which is incorporated herein by reference in its entirety.

FEDERALLY SPONSORED RESEARCH OR DEVELOPMENT

This invention was made with government support under Contract No. AIST-05-0081 awarded by NASA and under Contract No. CCF-1018977 awarded by the NSF. The government has certain rights in the invention.

BACKGROUND

A sensor network can include a set of sensors or sensing nodes that are capable of sensing, communicating, and processing. An early example of sensor networks is a network of acoustic sensors deployed at the ocean bottom to detect and keep track of submarines. In other examples, sensors can be used to perform various measurements (e.g., temperature or a presence of a target substance) or capture images for various applications. Disposable sensors with processing capabilities can be deployed in a number of environments to perform tasks such as target tracking (e.g. vehicles, chemical agents, or personnel), traffic control, environment monitoring and surveillance. Such sensors can be, for example, wireless sensors to wirelessly transmit or receive signals.

SUMMARY

Communication, collection and processing of data from such sensor networks require communication bandwidths to carry the data and consume energy. Hence, it may be desirable to reduce the amount of data to be communicated and transmitted and to reduce the energy consumed. In many applications, sensors can collect data at different locations, such that the information is correlated across locations, e.g., some closely located sensors. As an example, temperatures measured by temperature sensors near one another may be correlated so there is certain redundancy in the individual measurements obtained by these separate sensors. As a result, some unnecessary data may be transmitted through the network.

The redundancy in the data from sensors may be reduced or removed via signal processing at the sensor level to transform the raw data collected by the sensors. The transformed data with the reduced redundancy may be communicated through the sensor network. This reduction in the amount of data reduces the energy consumed in transmitting the data through the sensor network because the transmitted data is less than the raw data collected by the sensors. However, the processing at the sensor level for reducing the data redundancy consumes energy. It is possible that the total energy consumed in processing the raw data and the transmission of the processed data with a reduced amount of data bits may not be less than the energy consumed for directly transmitting the raw data. Hence, the data processing mechanism in processing the raw data at the sensor level to reduce data redundancy should be designed according to the specific structure sensor network to reduce the overall consumption of energy.

Systems and techniques for wireless sensor networks can include mechanisms for energy-aware compression optimization using distributed energy-efficient set covers. Systems and techniques for wireless sensor networks can include mechanisms for unidirectional graph-based wavelet transforms for sensor network data collections.

In one aspect, a technique for data collecting network such as wireless sensors includes detecting one or more remote nodes included in the wireless sensor network using a local power level that controls a radio range of the local node. The technique includes transmitting a local outdegree. The local outdegree can be based on a quantity of the one or more remote nodes. The technique includes receiving one or more remote outdegrees from the one or more remote nodes. The technique includes determining a local node type of the local node based on detecting a node type of the one or more remote nodes, using the one or more remote outdegrees, and using the local outdegree. The technique includes adjusting characteristics, including an energy usage characteristic and a data compression characteristic, of the wireless sensor network by selectively modifying the local power level and selectively changing the local node type. Other embodiments of this aspect include corresponding systems, apparatus, and computer programs encoded on computer storage devices are possible.

In another aspect, devices and systems can include transceiver electronics to communicate using a local power level that controls a radio range; and processor electronics configured to detect one or more nodes of a network based on the local power level, (control the transceiver electronics to transmit a local outdegree to the one or more detected nodes, the local outdegree being based on a quantity of detected nodes, receive one or more remote outdegrees from the one or more detected nodes, determine a local node type of the apparatus based on the local outdegree, the one or more remote outdegrees, and one or more detected node types corresponding to at least a portion of the one or more detected nodes, respectively, and adjust characteristics, including an energy usage characteristic and a data compression characteristic, of the network by selectively modifying the local power level and selectively changing the local node type. The processor electronics can be configured to cause an increase of the local power level to increase the radio range to reach one or more additional nodes and control a transmission of an additional signal at the increased local power level to cause the one or more additional nodes to become an aggregation type, where the local node type is a raw type, where a node of the aggregation type aggregates and compresses raw data.

In another aspect, a system can include one or more first nodes configured to collect data, route data, or both; and a second node configured to collect data, route data, or both. The second node can be configured to perform operations that include detecting one or more of the first nodes using a local power level that controls a radio range of the second node; transmitting a local outdegree, the local outdegree being based on a quantity of the one or more detected nodes; receiving one or more remote outdegrees from the one or more detected nodes; determining a node type of the second node based on information including the local outdegree, the one or more remote outdegrees, and one or more detected node types corresponding to the one or more detected nodes, respectively; and adjusting characteristics, including an energy usage characteristic and a data compression characteristic, of the system by selectively modifying the local power level and selectively changing the node type of the second node.

These and other aspects can include one or more of the following features. Determining the node type of the second node can include exchanging messages with at least a portion of the detected nodes, the messages indicating a node type, selectively assigning the node type of the second node as a raw type based on information including the local outdegree, the one or more remote outdegrees, and one or more of the messages, and selectively assigning the node type of the second node as an aggregation type based on a neighbor node being of the raw type, where a node of the raw type sends raw data to a node of the aggregation type, where the node of the aggregation type aggregates and compresses raw data. Detecting one or more of the first nodes can include transmitting a pilot signal based on the local power level, the pilot signal including an indication of the local power level; receiving one or more pilot signals from at least a portion of the first nodes; transmitting an acknowledgement message based on a maximum power level indicated by the one or more received pilot signals; and receiving one or more acknowledgements from at least a portion of the first nodes. Adjusting the characteristics can include increasing the local power level to increase the radio range to reach one or more additional nodes; and transmitting an additional signal at the increased local power level to cause at least a portion of the one or more additional nodes to become the aggregation type. A node of the aggregation type can be configured to perform a portion of a distributed wavelet transform to generate compressed data. Adjusting the characteristics can include performing an approximation-based distributed minimum set cover modification algorithm to change one or more node type assignments of nodes within the system to increase a data compression ratio. Performing the algorithm can include increasing the local power level to increase the radio range to reach one or more additional nodes.

The details of one or more implementations are set forth in the accompanying attachments, the drawings, and the description below. Other features will be apparent from the description and drawings.

BRIEF DESCRIPTION OF THE DRAWINGS

FIG. 5 shows an example of an algorithm based on a distributed heuristic for a minimum set cover.

FIGS. 6A, 6B, 6C, and 6D shows examples of distributed set-cover modifications.

FIG. 7 shows an example of an approximation-based distributed minimum set cover modification algorithm for raw data nodes.

FIG. 8 shows an example of an approximation-based distributed minimum set cover modification algorithm for aggregating nodes.

FIGS. 9A, 9B, 9C, and 9D shows different example configurations of a wireless sensor network based on different optimization techniques.

FIG. 12 shows an example of an algorithm for choosing a greedy set cover in an unweight directed graph.

FIG. 13 shows an example of an algorithm for choosing a greedy set cover in a weighted vertex directed graph.

DETAILED DESCRIPTION

Figure 1:
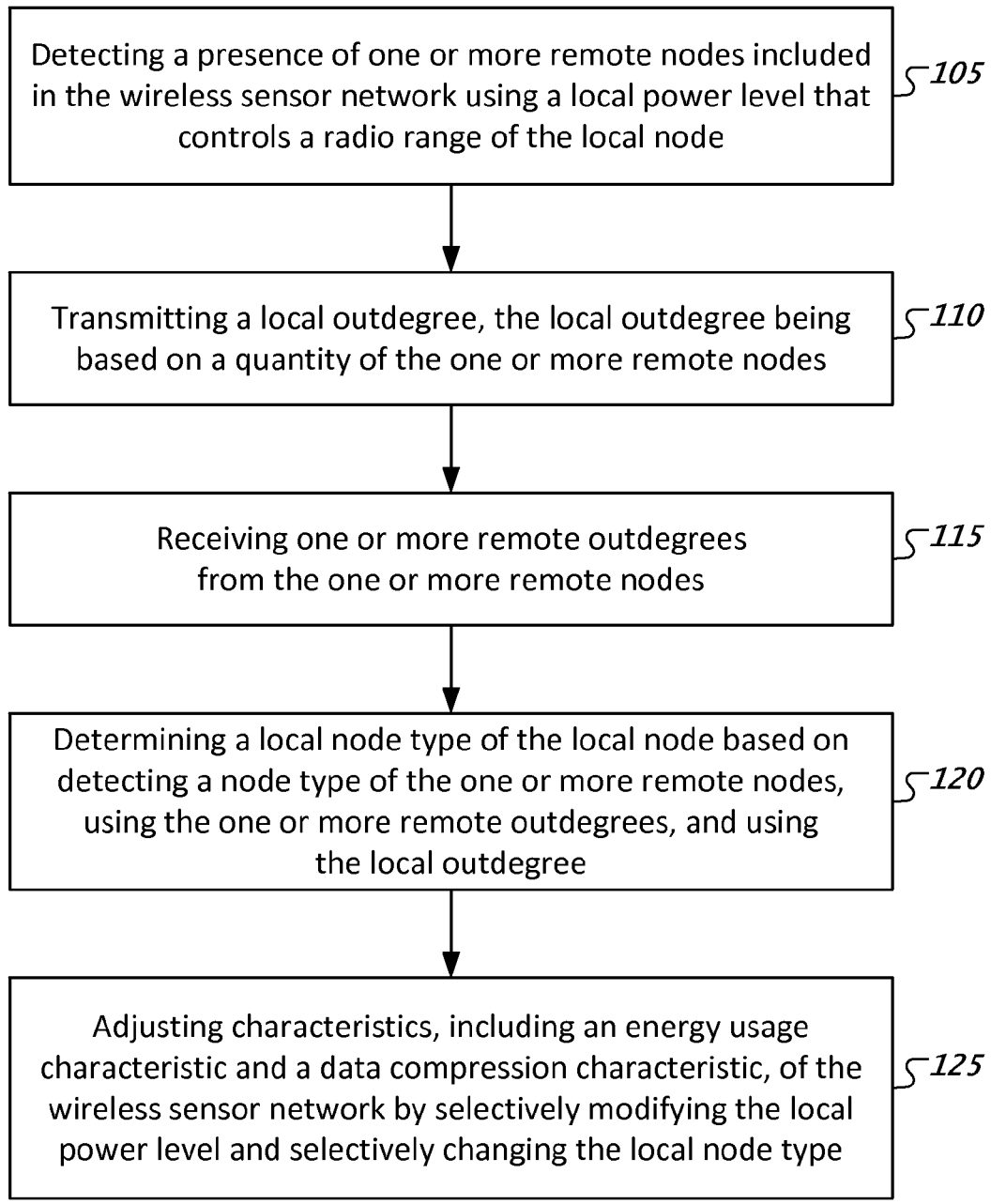
FIG. 1 shows an example of a process for adjusting energy and compression characteristics of a network.

This document describes, among others, implementations of data processing and communicating systems and techniques based on distributed wavelet compression algorithms for processing data at the sensor level to decorrelate data of the sensors and to reduce the energy consumption in sensor networks such as sensor networks with wireless sensors.

Sensor network nodes can run one or more algorithms that optimize spatial compression in a wireless sensor network (WSN) on one or more arbitrary communication graphs. In a spatial compression technique, some nodes such as raw nodes are required to transmit raw data before spatial compression can be performed. Nodes that receive raw data such as aggregating nodes can perform spatial compression based on information including data received from raw nodes.

A spatial compression scheme can use a raw aggregating node assignment (RANA) to enable compression. Since transmitting raw data bits in a WSN may require more bits than transmitting compressed data, a RANA for a WSN can be determined which minimizes the number of raw nodes in the network. In some implementations, nodes can choose different radio ranges for data transmission. The problem of optimally selecting raw nodes and their radio ranges can be formulated as a set cover problem, which can be solved via a linear programming based solution. In some implementations, distributed optimization algorithms can be performed by at least some nodes of a WSN.

In some implementations, sensor network nodes can perform a lifting-based wavelet transform for any arbitrary communication graph. In some implementations, nodes can perform one or more unidirectional graph-based wavelet transforms which are computed as data are forwarded towards the sink on a routing tree.

A WSN can optimize a RANA by assigning as raw data nodes with greater outdegree in the network and force their neighbors to become aggregating nodes. This can be performed in a distributed way by allowing each node to exchange a few messages with its neighbors and then decides between becoming a raw or aggregating node. A technique for RANA optimization can include determining the number of neighbors at each node, exchanging outdegree information, and performing sequential raw aggregating assignment. In some implementations, a WSN can perform a distributed heuristic for minimum set cover.

A wireless sensor node can include processor electronics such as a microprocessor that implements methods such as one or more of the techniques presented in this document. A node can include transceiver electronics to send and/or receive wireless signals over one or more communication interfaces such as an antenna. A node can include other communication interfaces for transmitting and receiving data. A node can include one or more memories configured to store information such as data and/or instructions.

Nodes in a WSN can be energy-constrained devices. The WSN can collectively perform in-network compression for energy-efficient data gathering and reporting. In the context of compression schemes which use distributed spatial transforms, an objective is to compress the data into transform coefficients that require as few bits as possible to transmit. Distributed spatial transforms can use spatial transforms to de-correlate data across neighboring nodes, leading to representations which require a smaller number of bits than that needed for representing raw data. This ultimately reduces communication costs and power consumption.

A WSN can use one or more compression schemes to reduce costs associated with transmitting sensor data within the WSN to one or more sink nodes. Various examples of compression schemes for data-gathering include cluster-based compression and routing-driven compression. In cluster-based compression, the network is divided into clusters and nodes in each cluster route data to a designated cluster-head, which compresses the data received from nodes in its cluster and forwards the compressed result to the sinks. Clearly in this case joint compression of data aggregated on the cluster-head should lead to very few bits required to represent it. Note that here cluster-heads act as aggregating nodes, and others serve as raw nodes. In the routing-driven compression schemes, raw nodes first transmit raw data to their neighbors, then each neighbor compresses its own data using any raw data that it receives and forwards the compressed result to the sink. Nodes in a network can use a lifting-based wavelet transforms. These wavelet transforms are useful in distributed data gathering applications because they have been shown to provide good coding efficiency while leading to simple constructions for arbitrary network configurations. These transforms are constructed by first dividing nodes into disjoint sets of even and odd nodes. Data from odd nodes are then predicted using data from neighboring even nodes, yielding detail coefficients. Then, data from even nodes are updated using detail coefficients from neighboring odd nodes, yielding smooth coefficients. Lifting transforms are invertible by construction and only require assigning to each node a role (even or odd). Moreover, the lifting procedure facilitates distributed computations which are localized, e.g., nodes can compute transform coefficients using only data received from their direct (1-hop) neighbors. Note that in a lifting transform, even nodes first transmit raw data to their odd neighbors, then odd neighbors use this data to compute detail coefficients. Thus, even nodes serve as raw nodes and odd nodes serve as aggregating nodes.

This document describes, among other things, distributed transforms for data-gathering applications for arbitrary networks that achieves significant gains over raw data transmission, while requiring minimal coordination between nodes. In most spatial compression schemes, some nodes (e.g., raw nodes) are required to transmit raw data before spatial compression can be performed. Nodes that receive raw data (e.g., aggregating nodes) can then perform spatial compression. Such schemes use a RANA to enable compression. Typically, transmitting raw data requires more bits than transmitting compressed data. Some WSNs use RANAs that select raw nodes to minimize overall energy consumption in the network. In some implementations, the problem of optimally selecting raw nodes can be formulated as a set cover problem, which can be solved in a distributed fashion for a variety of scenarios, including single-sink, multi-sink and gossip-based networks.

Distributed data-processing methods can be implemented for any domain where the underlying relations between data locations can be represented by a weighted graph. The data defined on the vertices of an arbitrary network, for example, can be naturally modeled as a weighted graph. Signals such as those coming from imaging sensors can be interpreted as data (e.g., pixel intensities) on a lattice graph. The links on the graph can be binary (e.g., they exist or do not exist) or can represent a cost (e.g., bandwidth, latency, or energy) of exchanging data across the link. Distributed data-processing methods are desirable in a wide variety of applications where the nodes (data sources) exchange data to perform some coordinated task and where global centralized operations are impractical either due to the massive size of the data set or the cost of data exchanges. It is therefore advantageous to develop algorithms that can optimize the amount of data communication that is required for a given application. WSN can perform data gathering with in-network compression in which nodes send their data to single or multiple sinks, or to all other nodes in the network. The simplest form of data gathering is to have all nodes send raw data to the sink(s). In some implementations, raw data refers to data for which no spatial processing (e.g., compression) has been performed. Decorrelating before encoding the data is useful since it can lead to data representations requiring fewer bits than what is needed to represent raw data. This will reduce the amount of data that nodes transmit to the sinks, and ultimately reduce the total cost of data-gathering in the network. Since bit-rate can be significantly reduced by compression, the transmission cost associated to data produced by aggregating nodes will be significantly lower than the cost associated to raw data transmission.

Distributed compression schemes that exploit spatial correlation can require an assignment of nodes as either raw or aggregating (e.g., RANA) and one or more techniques for compressing data at aggregating nodes. A WSN can find RANAs that minimize total energy consumption under different scenarios such as single-sink ("all-to-one"), multiple sink ("all-to-few") or gossip ("all-to-all") cases. A WSN can use one or more unidirectional lifting transforms, which will be described later, for compressing data. The raw-aggregating node assignment techniques can be applied a broader class of two-channel transforms where nodes in each channel are assigned a different transform. A WSN can be used for distributed image/video gathering, where raw nodes can transmit images to aggregating nodes, which would then encode them jointly. Cost functions used for RANA can be based on the type of data and compression algorithms used in the WSN.

FIG. 1 shows an example of a process for adjusting energy and compression characteristics of a network. At 105, the process includes detecting a presence of one or more remote nodes included in the wireless sensor network using a local power level that controls a radio range of the local node. Detecting the presence of one or more remote nodes can include transmitting a pilot signal based on the local power level, the pilot signal comprising an indication of the local power level, receiving one or more pilot signals from the one or more remote nodes, transmitting an acknowledgement message based on a maximum power level indicated by the one or more received pilot signals, and receiving one or more acknowledgements from one or more of the remote nodes. The words "local" and "remote" are used to distinguish between different nodes. For example, with respect to a local node (which can be any node in a network), other nodes (that are not the local node) in a network are referred to as remote nodes.

At 110, the process includes transmitting a local outdegree, the local outdegree being based on a quantity of the one or more remote nodes. At 115, the process includes receiving one or more remote outdegrees from the one or more remote nodes.

At 120, the process includes determining a local node type of the local node based on detecting a node type of the one or more remote nodes, using the one or more remote outdegrees, and using the local outdegree. A node type can be a raw type or an aggregation type. A node of the raw type can send raw data to a node of the aggregation type. A node of the aggregation type aggregates and compresses raw data. The node of the aggregation type can be configured to perform a portion of a distributed wavelet transform to generate compressed data.

In some implementations, at 120, determining the local node type can include exchanging messages with at least a portion of the one or more remote nodes, the messages indicating a node type. Determining the local node type can include selectively assigning the local node type as a raw type based on information comprising the local outdegree, the one or more remote outdegrees, and one or more of the messages. Determining the local node type can include selectively assigning the local node type as an aggregation type based on a neighbor node being of the raw type, wherein a node of the raw type sends raw data to a node of the aggregation type, wherein the node of the aggregation type aggregates and compresses raw data.

At 125, the process includes adjusting characteristics, including an energy usage characteristic and a data compression characteristic, of the wireless sensor network by selectively modifying the local power level and selectively changing the local node type. Adjusting the characteristics can include performing an approximation-based distributed minimum set cover modification algorithm to change one or more node type assignments within the wireless sensor network to increase a data compression ratio. Performing the algorithm can include increasing the local power level to increase the radio range of the local node to reach one or more additional remote nodes.

Figure 2:
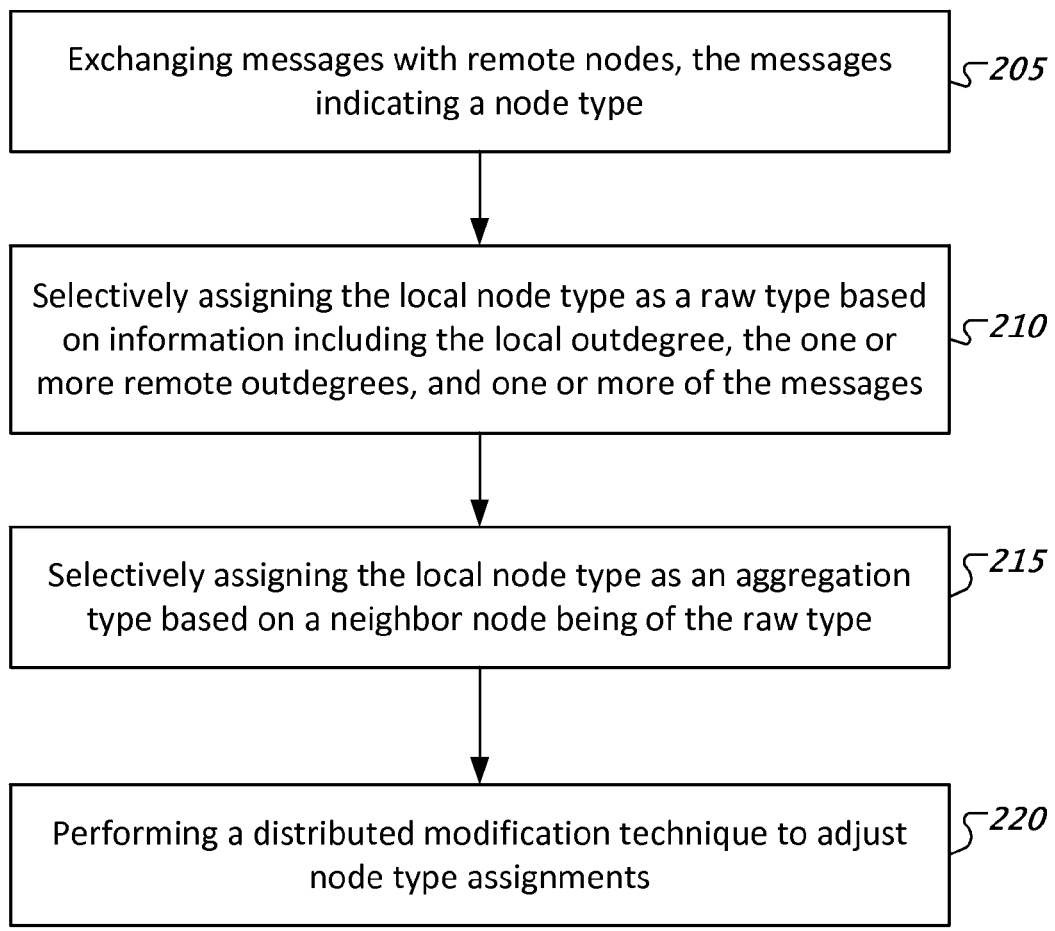
FIG. 2 shows another example of a process for adjusting energy and compression characteristics of a network.

FIG. 2 shows another example of a process for adjusting energy and compression characteristics of a network. At 205, the process includes exchanging messages with remote nodes, the messages indicating a node type. At 210, the process includes selectively assigning the local node type as a raw type based on information including the local outdegree, the one or more remote outdegrees, and one or more of the messages. At 215, the process includes selectively assigning the local node type as an aggregation type based on a neighbor node being of the raw type. At 220, the process includes performing a distributed modification technique to adjust node type assignments. Performing a distributed modification technique can include increasing the local power level to increase the radio range of the local node to reach one or more additional remote nodes; and transmitting an additional signal at the increased local power level to cause the one or more additional remote nodes to become the aggregation type.

Figure 3:
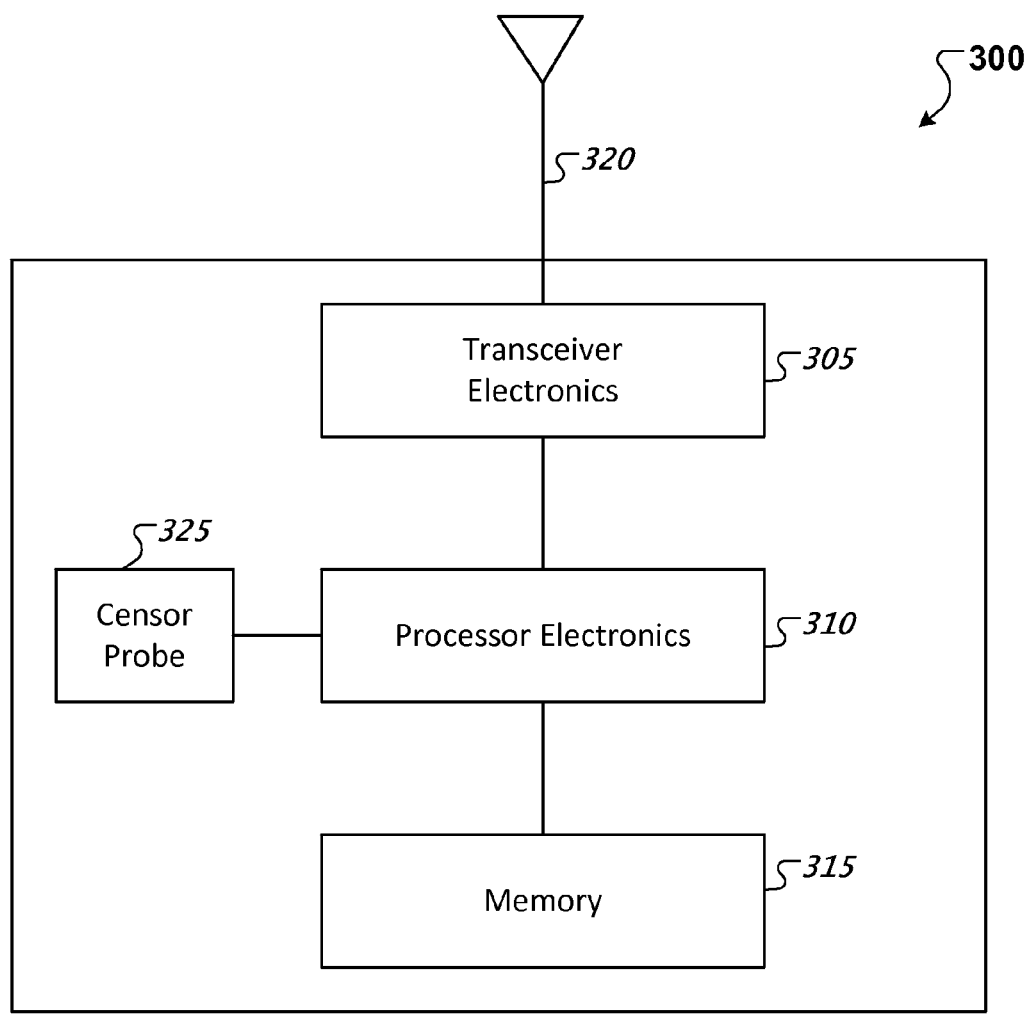
FIG. 3 shows an example of a block diagram of a node included in a wireless sensor network.

FIG. 3 shows an example of a block diagram of a node included in a wireless sensor network. A node 300 can include transceiver electronics 305, processor electronics 310, and a memory 315. The transceiver electronics 305 can be coupled with one or more antennas 320 to transmit and receives signals. Processor electronics 310 can include one or more processors that implement one or more techniques presented in this disclosure. The processor electronics 310 can include a central processing unit (CPU), an application specific integrated circuit (ASIC), a field-programmable gate array (FPGA), or another suitable component. In some implementations, transceiver electronics 305 include integrated transmitting and receiving circuitry. The node 300 can include one or more memories 315 configured to store information such as data, instructions, or both. In some implementations, node 300 includes dedicated circuitry for transmitting and dedicated circuitry for receiving. The node 300 can include one or more sensor probes 325 for collecting data such as tempature, pressure, video, audio, radiation measurements, and RF energy measurements. Other types of probes are possible.

1 Distributed Data Gathering Techniques

Let $G=(V, E)$ be a directed communication graph representing an arbitrary network with N nodes indexed by $n \in I=\{1, 2, \ldots, N\}$ and K sinks indexed by $k \in S=\{N+1, N+2, \ldots, N+K\}$. Assume that each edge $(m, n) \in E$ denotes a communication link from node m to node n, and that each node has to transmit its data towards the set of sinks as efficiently as possible. Efficiency can be measured in relation to the energy consumption, bandwidth utilization, delay, etc. Therefore, nodes have to send their data to the sinks following a routing strategy, denoted as $T=(V, E_T)$, which minimizes some cost metric (i.e., number of communications, energy consumption, etc.). For instance, an energy-aware routing strategy for single-sink networks T can be the well-known shortest path tree (SPT). Similarly, in the multiple-sink case, T can be defined as the union of the different energy-aware multicast routing trees, spanning each sensor from all sinks A transmission schedule can be defined in which, first of all, raw nodes send unprocessed data to their parents in T (there may be multiple parents in the multi-sink case). Then, aggregating parents and all other aggregating nodes that have received this data use it to compute their detail coefficients. After that, both raw and compressed data are forwarded to the set of sinks following the given routing strategy. Note that in some wireless networks, the communications are of the broadcast nature and hence all nodes within the neighborhood of raw nodes will receive the raw data. Let $g(n)$ be the cost of routing one bit from node n to all sinks following T.

Assume that raw data is encoded using $B_r$ bits, and $c_n$ is a rate-reduction ratio that reflects the level of data compression in node n. We denote the set of raw data nodes as D, and the set of aggregating nodes as A. Thus, the total routing cost for gathering all data in the sinks can be written as $$C(A, D) = \sum_{m \in D} B_r g(n) + \sum_{n \in A} c_n B_r g(n). \qquad (1)$$

We assume $c_n$ to be some constant $c \in (0, 1]$, which would be the case for dense networks where the coding efficiency is fairly uniform everywhere. Note that $\Sigma_{m \in I} g(m) = \Sigma_{m \in D} g(m) + \Sigma_{n \in A} g(n)$ since $I = D \cup A$ and $D \cap A = \emptyset$. Therefore (1) becomes $$C(D) = (1-c)B_r \sum_{m \in D} g(m) + cB_r \sum_{n \in I} g(n). \qquad (2)$$

Since $B_r$, c and (1−c) have constant values and the graph G is fixed, which means that $cB_r \Sigma_{n \in I} g(n)$ is also constant, the only optimization left is to minimize $\Sigma_{m \in D} g(m)$ under the constraint that each raw node in D covers at least one aggregating node in A. Thus, assuming the transmissions between nodes are optimized by the routing strategy, finding a minimum cost transform is equivalent to finding a RANA that minimizes the total routing cost of the raw nodes. Note that a trade-off arises: reducing the number of raw nodes means that the number of neighbors whose data each aggregating node can use is also reduced. This may reduce the level of decorrelation achieved by aggregating nodes and, hence, the number of bits needed to represent detail coefficients may increase.

1.1 Centralized Optimization

Assume that sinks know the network topology and have the ability to coordinate the operation of other nodes. In such case, sinks can run the same centralized RANA optimization and collaboratively distribute information about RANA to nodes in the network. For lifting-based transforms, the RANA can be optimized by minimizing $\Sigma_{m \in D} g(m)$ while ensuring that raw nodes in D form a set-cover in G. A single-sink case the optimization can be reduced to solving a MWSC problem with weights being defined as the penalty cost of assigning each node to the subset D. Note that a single-sink network is a particular case of the problem formulated before, and therefore we can approximate the optimal RANA for any number K of sinks with a centralized greedy algorithm.

1.2 Distributed Optimization

Now assume that no centralized optimization is possible. Thus, nodes will need to coordinate locally to optimize the transform. Note that, in such scenario, nodes do not know a priori the cost of routing their data towards the sinks, hence, the algebraic formulation used for the centralized case is not longer valid. One example of this scenario would be when nodes want to disseminate their data all over the network (all to all). Centralized routing strategies for data broadcasting (i.e., minimum spanning tree) are impractical since they are not robust to changes in the network topology and link or node failures. For this reason, gossip-based algorithms have been widely studied for information processing and data dissemination during the last few years. In gossip-based protocols, at each iteration, one random node forwards packets to one or a few of its neighbors chosen with a certain probability. The trade-off of these strategies is that they might require more communications and time to converge than centralized routing approaches. Although applications based on gossip are increasingly being proposed, there is a lack of work on spatial compression and distributed data gathering in this kind of networks. With the implementation of our transform as a first step, we provide a distributed scheme in which data is first decorrelated and then disseminated via standard gossip techniques.

Assuming that the routing cost to broadcast data all over the network is approximately the same for all nodes (i.e., $g(m) \approx g$), the minimization term becomes $\Sigma_{m \in D} g = g|D|$. Therefore, the problem is now equivalent to solving a minimum set-covering (MSC) problem in a distributed manner. Once the RANA has been optimized, the lifting transform can be implemented following the same steps as before with raw nodes sending first raw data to their neighbors and then aggregating neighbors computing detail coefficients with the raw data received. This coordination can be performed by defining two different timeouts depending on the node's assignment. Once data has been compressed in aggregating nodes, nodes can start broadcasting both raw and transformed coefficients all over the network following any kind of gossip-based strategy. To ensure invertibility in the network, it can be assumes that aggregating nodes encapsulate with their detail coefficients the indexes of the raw nodes they have used for compression.

Various algorithms for optimizing routing-driven compression schemes have been described herein for distributed data gathering in arbitrary networks that minimize the total energy consumption in the network. This optimization can be formed as a set covering problem, where nodes are assigned as raw nodes, which form the set cover, and aggregating nodes, which are covered by raw nodes. RANA is based on a coordination among nodes. In some implementations, a WSN employs a centralized RANA in which nodes receive their RANA from the central nodes (e.g., sinks) which run a centralized RANA optimization. In some implementations, a WSN employs a distributed RANA, where nodes coordinate to find a distributed approximation of set-cover solution. Minimizing raw data exchange can minimize resource utilization in a network, such as air link resources, and can decrease the total energy consumption of the WSN. Minimizing raw data exchange can be advantageous for efficient resource usage in other applications such as distributed estimation and detection. Thus, similar types of optimization algorithms can be developed with those applications in mind.

2 Node Assignments and Node Radio Range Optimizations

This document provides, among other things, details and examples of centralized and distributed algorithms for finding minimum cost set covers for routing-driven compression schemes. These algorithms jointly optimize the choice of radio range and node assignment A centralized algorithm is described that provides a joint selection of radio range and RANA. The centralized algorithm can be formulated as a linear program and is solved using standard tools. A distributed set covering algorithm is described for optimizing a RANA in a distributed fashion. The distributed algorithm can include one or more iterations in which nodes can modify their radio ranges to improve on the RANA. RANA improvements can include having fewer raw nodes than the RANAs previous methods and provide reductions (e.g., up to 25% reductions) in total cost as compared to an existing routing-driven approach and provide reductions (e.g., up to 65% reduction) in total cost with respect to raw-data transmissions. Such optimizations can be applied to cluster-based compression schemes.

For a given RANA, there is a trade-off Reducing the number of raw data nodes (by increasing the radio range of some nodes) means that the average distance between raw nodes and aggregating nodes will increase. This increase in distance (due to an increase in radio range) tends to reduce the level of correlation of data received by aggregating nodes, which in turn leads to potentially lower coding efficiency (i.e., higher rate will be required to represent the data produced by aggregating nodes). On the other hand, if we wish to ensure that the distance between raw and aggregating nodes is low, we may need to add more raw nodes. A WSN can optimize the number of nodes which send raw data while taking into account this trade-off. The WSN can use raw-aggregating node assignments which effectively exploit this trade-off by jointly optimizing the radio range at each node with the node assignment.

2.1 General Formulation

A optimization technique can use a general cost function for distributed compression in WSNs. Minimizing such a cost function can be equivalent to solving a set-cover problem on graph. For example, a network can include N nodes and a sink (indexed by N+1), where each node can collect some raw data $x(n)$ that it needs to forward to the sink. Let $B_r$ denote the number of bits used to represent the raw data $x(n)$. Assume that each node (indexed by $n \in I = \{1, 2, \ldots, N\}$) transmits using a radio range of $R_n$ and let $G=(V, E)$ be the directed communication graph which results from these choices of radio ranges. The set of chosen radio ranges for all nodes in I is denoted by $R = \{R_m\}_{(m \in \{1, 2, \ldots N\})}$.

The set of raw-data nodes is denoted by D The set of aggregating nodes in the network is denoted by A. Let $N_R(n)$ and $N_{[R]}(n)$ denote the open and closed neighborhoods respectively of node n with R radio range. Thus $N_{[R]}(n) = \{n\} \cup N_R(n)$ where $N_R(n)$ is the set of all nodes that can hear transmissions from n. For a fixed graph (e.g., given routing tree) when radio ranges of nodes are fixed, $N_n = N_{R_n}(n)$ and $N_{[n]}=N_{[R_n]}(n)$ with $R_n$ being the fixed radio range required to forward data of node n to its parent along the routing tree.

Furthermore, let $T=(V, E')$ denote a routing tree rooted at the sink node. Such a tree can be constructed using standard routing protocols such as the Collection Tree Protocol (CTP). The routing tree T is denoted by $\tilde{\rho}(m)$. Further, let $g(n, m)$ denote the cost to route a single bit from node n to node m along shortest path in the communication graph G. The cost $g(n, m)$ can, for example, be proportional to the number of hops, or to the sum of the squared distances between all nodes along the path from n to node m, etc. In some implementations, $g(n)$ denotes the cost to route a single bit from node n to the sink along T (e.g., $g(n)=g(n, N+1)$). In order to cover more general case of of variable radio ranges (e.g., where nodes can also adjust their radio ranges), the function $f(n, R_n, m)$ can be defined as the cost of transmitting a single bit from a node n to node m when it has a radio range $R_n$.

In the general framework, first each raw-node n transmits its data $x(n)$ to some processing parent $\tilde{\rho}(n)$ assigned to n. The processing parent $\tilde{\rho}(n)$ compresses and encodes the received data of n and transmits it to the sink along the routing tree T. The processing parent node can for example be the sink node in a routing driven scheme (as the un-encoded data from raw-nodes flows all the way to the sink), or it can be an aggregating node in cluster based schemes. Thus the cost of routing data from raw-node n to the sink can be split into (i) $B_r f(n, R_n, \tilde{\rho}(n))$, the cost of routing $B_r$ bits of raw-data to the processing parent and (ii) $c_n B_r g(\tilde{\rho}(n))$, the cost of routing encoded data from processing parent to the sink along shortest path. Here $c_n$ is a rate-reduction ratio for node n's data, indicating, number of bits transmitted per single bit of raw-data. Thus a lower value of $c_n$ indicates better coding efficiency for the data at node n. On the other hand, each aggregating node m listens, receives raw data from its raw node neighbors and generates the compressed data, which are then transmitted to the sink along the shortest path. Therefore the cost of routing data from aggregating nodes is given by $c_m B_r g(m)$. The total routing cost is then equal to the sum of costs of routing data from each node:

$$C(D, A, R) = \sum_{n \in D} B_r f(n, R_n, \tilde{\rho}(n)) + \sum_{n \in D} c_n B_r g(\tilde{\rho}(n)) + \sum_{m \in A} c_m B_r g(m) \quad (3)$$

Note that a given assignment of A and D only makes sense if every aggregating node n has at least one raw data neighbor from which it can compress its own data, i.e., for all $n \in A$, $N_n \neq \emptyset$. This is equivalent to requiring that every aggregating node be "covered" by at least one raw data node, or more precisely, that $\cup_{m \in D} N_{[m]} = I$. In other words, $\cup_{m \in D} N_{[m]}$ provides a set cover for the nodes in G and the goal is to find a minimum cost set-cover (MCSC) stated in Definition 1 below.

Definition 1 Minimum Cost Set Cover Problem: For graph $G=(V, E)$ define the closed neighborhood $N_{[RR_v]}(v)$ as a disk centered at node v with radius $R_v$ and let N be the collection of all these disks. A set-cover $D \subseteq N$ is then a sub collection of the sets whose union is V. The MCSC problem is to find a set-cover which minimizes the cost function given in (3).

The MCSC problem is a general minimum set cover problem and thus NP-hard. In the next subsection we describe set-cover formulations for specific cases that will lead us to simpler solutions.

2.1.1 Optimization for Fixed Graph

In this section we describe a simplication of the cost function for fixed graph case in which nodes have a fixed set of radio ranges. This can be for instance be the case when nodes choose a radio range just large enough to route their data to their parent along the routing tree T.

In the fixed graph case, the data is forwarded along shortest path from one node to another and therefore in this case the cost to route a single bit from any node n to any node m is $f(n, R_n, m)=g(n, m)$. The cost function in (3) then becomes:

$$C(D, A) = \sum_{n \in D} B_r g(n, \tilde{\rho}(n)) + \sum_{n \in D} c_n B_r g(\tilde{\rho}(n)) + \sum_{m \in A} c_m B_r g(m) \quad (4)$$

For simplicity, we suppose that the compressed data for each node n is encoded using $cB_r$ bits for some constant $c \in (0, 1]$. This could be the case in fairly dense networks since then coding efficiency is uniform everywhere. Thus, the amount of compression that can be achieved will be about the same for all aggregating/processing nodes. The total cost to compute a encoded coefficients in a distributed manner and route the resulting coefficients to the sink now becomes $$C(D, A) = \sum_{n \in D} B_r g(n, \tilde{\rho}(n)) + \sum_{n \in D} cB_r g(\tilde{\rho}(n)) + \sum_{m \in A} cB_r g(n) \quad (5)$$

Note that $\Sigma_{m \in I} g(m) = \Sigma_{m \in D} g(m) + \Sigma_{n \in A} g(n)$ since $I = D \cup A$ and $D \cap A = \emptyset$. Therefore, (5) becomes $$C(D, A) = \sum_{n \in D} [B_r g(n, \tilde{\rho}(n)) + cB_r g(\tilde{\rho}(n)) - cB_r g(n)] + \quad (6)$$
$$\sum_{m \in I} cB_r g(n)$$
$$= \sum_{m \in D} B_r w(n) + \sum_{m \in I} cB_r g(n)$$

where $w(n) = [g(n, \tilde{\rho}(n)) + c(g(\tilde{\rho}(n)) - g(n))]$ is a generalized weight function defined on raw-nodes. This weight function $w(n)$ at node n depends on (i) cost of routing node n's data to its processing parent $\tilde{\rho}(n)$, (ii) rate-reduction ratio c and (iii) its routing cost to sink $g(n)$. We will describe shortly the weight functions for routing-driven schemes and clustering based schemes. Further we observe that $B_r$ and c in (6) are constants. Moreover, since the graph G is fixed, $c\Sigma_{n \in I} B_r g(n)$ is also constant. Therefore, the only thing left to optimize in (6) is $\Sigma_{n \in D}(B_r w(n))$. Thus minimizing (6) under the set-cover constraint described above leads to finding a minimum weighted set-cover (MWSC) problem stated in Definition 2 below.

Definition 2 Minimum Weight Set Cover Problem: For graph $G=(V, E)$ denote closed neighborhood $n_{[v]} = n_{[v]} = \{v\} \cup \{u \in V : vu \in E\}$ as a disk centered at node v with corresponding weight $g(v)$ for all nodes $v \in I$. Given a collection N of all sets $\{n_{[v]}\}$, a set-cover $D \subseteq N$ is a sub collection of the sets whose union is V. The MWSC problem is to find a set-cover with minimum weights.

2.1.2 Routing-Driven Compression Optimization

In routing-driven compression scheme nodes are first partitioned into raw nodes in set D and aggregating nodes in set A. For these types of schemes, raw nodes transmit their raw-data all the way to the sink along routing tree T. Thus in this case sink node is the processing parent for all raw-node (i.e. $\tilde{\rho}(n) = N+1$) and therefore $g(n, \tilde{\rho}(n)) = g(n)$. Further the cost of routing data from sink to sink is 0, therefore $g(\tilde{\rho}(n)) = 0$. So the weighted function w(n) for raw-node n in (6) becomes w(n)=(1−c)g(n) and (6) can now be written as:

$$C(A, D) = (1 - c)B_r \sum_{m \in D} g(m) + cB_r \sum_{n \in I} g(n). \quad (7)$$

Note that $B_r$, c and (1−c) are constants. Moreover, since the graph G is fixed, $c\Sigma_{n \in I} B_r g(n)$ is also constant. Therefore, the only thing left to optimize in (7) is $\Sigma_{m \in D} g(m)$, under the constraint that raw-nodes form a set-cover (i.e, $\cup_{m \in D} N_{[m]} = I$) Thus, finding a minimum cost transform is equivalent to finding an assignment of raw data and aggregating nodes which minimizes the average routing cost of the raw nodes (i.e., $\Sigma_{m \in D} g(m)$) under the constraint that $\cup_{m \in D} N_{[m]}$ provides a set cover for G. This can be formulated as a MWSC problem described in Definition 2.

The solution of the MWSC problem leads to raw-aggregating assignments which minimize the average routing cost for raw nodes subject to a fixed graph (i.e., fixed radio ranges for each node) by optimizing the node selection. The problem of joint optimization (i.e. with respect to both radio range and RANA assignments) of cost function can be referred to as a Restricted Minimum Weighted Set-Cover (RMWSC) problem. A WSN can perform a joint optimization to jointly select the radio range and node assignment using a linear program formulation. The WSN can use distributed approximations in this joint optimization.

2.1.3 Cluster-Based Compression Optimization

Now consider a cluster-based compression scheme where nodes are again partitioned into raw nodes D and aggregating nodes A. In these schemes each raw node transmit its raw-data to the assigned aggregating node (called cluster-head). Thus cost of routing data from raw-node n is given by g(n, $\tilde{\rho}(n)$) where $\tilde{\rho}(n)$ is the nearest aggregating node (i.e. cluster-head) for node n. The weight function for raw-node n in (4) for the cluster based scheme is w(n)=g(n, $\tilde{\rho}(n)$)+c(g($\tilde{\rho}(n)$)−g(n)). Since for cluster based methods raw-nodes are situated very close to the cluster-heads therefore g(n)−g(p(n)) is small (since cost of routing data from node n to the sink is almost equal to cost of routing data from cluster-head to the sink). Further constant c∈(0, 1] is very small for a highly correlated network. Therefore the cost c(g(n)−g(p(n)))<<g(n, ρ(n)) and can be neglected in the weight function. Thus the weight function in the cluster-based schemes is w(n)≈g(n, ρ(n)) and for these schemes Equation (4) becomes:

$$C(A, D) = B_r \sum_{m \in D} g(n, \rho(n)) + cB_r \sum_{n \in I} g(n). \quad (8)$$

As before, c and $B_r$ are constants and for fixed graph case, $c\Sigma_{n \in I} B_r g(n)$ is also constant. Therefore, the only thing left to optimize in (8) is $\Sigma_{m \in D} g(n, \rho n)$, which is the cost of routing data from raw-nodes to the cluster-heads. Note that the constraint that raw-nodes form a set-cover (i.e, $\cup_{m \in D} N_{[m]} = I$) still needs to be satisfied and therefore optimizing the cost function in (8) is equivalent to solving an MWSC problem stated in Definition 2. The solution of MWSC for cluster-based schemes leads to RANA, which minimizes the routing cost from raw nodes to their cluster-heads. Thus for a fixed cluster case (i.e. number of aggregating nodes fixed, say k), the problem is clustering the nodes into k clusters and can be solved by a simple k-means clustering algorithm. We show results of applying k-means clustering to obtain RANA on the network nodes in the experimental section. The assignment optimization for cluster-based schemes can be developed along similar lines as the techniques presented here, and remains a topic for future work.

2.2 Joint Optimization

In a joint optimization for a routing-driven scheme, adjusting a RANA and a radio range $R_n$ of each node n in I to minimize the total transmission cost. Given such a RANA, a WSN can operate by first having each raw node n broadcast its data over a radio range $R_n$. This is followed by aggregating nodes processing their data based on what they have received from neighboring raw nodes and forwarding it to the sink along the routing tree T. Therefore similar to section 2.1.2, the processing parent $\tilde{\rho}(n)$=N+1 and the cost function $f$(n, $R_n$, $\tilde{\rho}(n)$) is now =$f$(n, $R_n$) as defined in (9).

$$f(n, R_n) = R_n^2 + \min_{s \in N_{R_n}(n)} g(s) \quad (9)$$

This is because raw nodes first broadcast their data over a radio range $R_n$ and the data is then forwarded to the sink through nearest (in terms of cost) neighbor in $N_{R_n}(n)$. By applying these simplifications, the cost function in (3) changes to form given in (10).

$$C(D, A, R) = \sum_{m \in D} B_r f(m, R_m) + \sum_{n \in A} c_n B_r g(n) \quad (10)$$

Thus total cost is a function of both raw node set D and their chosen radio range set R.

However optimizing the cost function in (10) is NP-hard (since the problem is a minimum cost set-cover problem), and its complexity increases exponentially with the size of the network. In order to simplify it, it can be observed that there exist only a finite number of radio range choices R∈[$R^{min}$, $R^{max}$] for raw-nodes, which can lead to an optimal solution. Further, it can be observed that in (10) the rate-reduction ratio $c_n$ is unknown at each aggregating node n. The value of $c_n$ depends on which raw-nodes can broadcast their data to node n and what is the correlation between those raw-nodes' data with that of node n. Thus node n in general has a combinatorial number of possible rate-reduction ratios $c_n$. However we can reduce the size of this set by $|N_{R^{max}}{}^n|$ approximate values of $c_n$. This is explained in Section 2.2.2. Thus with finitely many choices of radio ranges and bit-reduction ratios the optimization of cost function in (10), reduces to a Restricted Minimum Weighted Set Cover (RMWSC) problem.

2.2.1 Quantized Radio Ranges Construction

Figure 4:
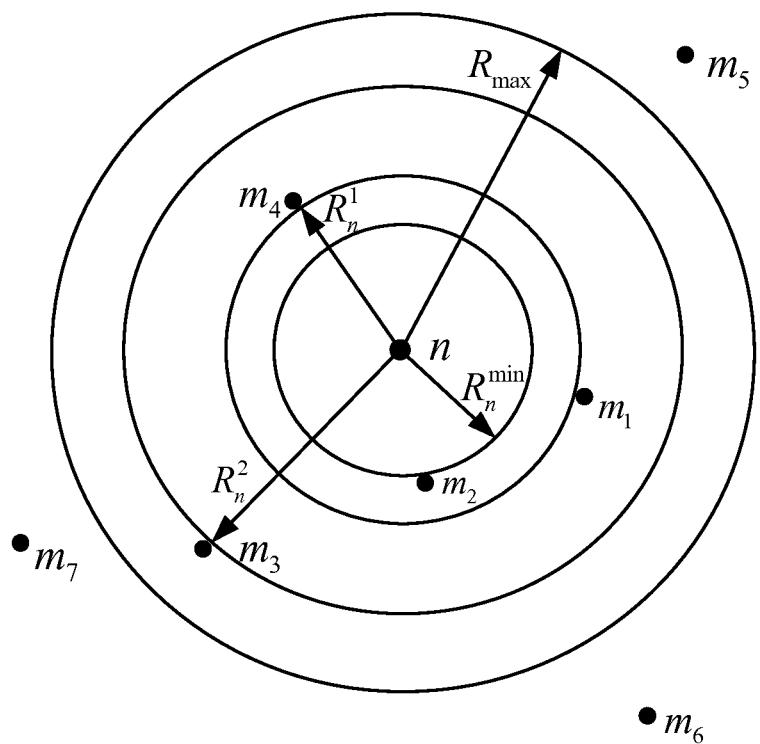
FIG. 4 shows an example of a quantized radii construction.

FIG. 4 shows an example of a quantized radii construction. In this figure, a graph 405 shows a raw-node (labeled with n) and other nodes (labeled with m). The raw-node n can cover $\alpha_n$=3 other nodes within $R^{max}$ radius. The size of the neighborhood $N_R$(n) only increases corresponding to radii {$R_n^1$, $R_n^2$, $R_n^3$}⊂[$R_m{}^{min}$, $R_{max}$]. In this example, there are $\alpha_n=|N_{R^{max}}{}^n|$ efficient choices of radio ranges for node n. The minimum cost solution for (10) can be found by searching a set of set-cover solutions of size equal to product of the candidate choices for each node which is bounded by $O((\theta d_{max})^N)$ for some constant θ≤1 (for $d_{max}$, maximum out-degree of the network with maximum allowed radio range $R_{max}$).

2.2.2 Rate Reduction Ratio Estimation

The value of $c_n$ at an aggregating node depends on its neighboring raw-nodes, the type of coding that it employs to compress its data and the type of encoding scheme used in the network. To estimate $c_n$ at each node n we have two choices. First we can estimate a model of $c_n$ in the network. For example if the nodes have high correlation in their data, then any aggregation strategy would reduce number of bits required for aggregated data (hence small $c_n$). Therefore, we can model $c_n$ inversely proportional to correlation between nodes' data which, for most physical phenomena, can be assumed to be a decaying function (denoted $R_{xx}(d)$) of distance. However, this kind of modeling provides very conservative estimates of $c_n$, which results in very loose estimate of cost function. Second we can compute the exact value of $c_n$, for each possible set of raw neighbors by computing and encoding the transform coefficients at node n with some training data.

In second case this would mean computing roughly $$O(2^{N_{C_2}})$$

rate-reduction ratio values per node, which is combinatorial and therefore intractable. We therefore propose to compute only pairwise rate-reduction ratio between neighboring nodes. Thus for each neighbor $m_k$, $k \in \{1, 2, \ldots \alpha_n\}$ of node n we can compute a $c_n(m_k) = c_{n,k}$ as the worst case $c_n$ if node n can only listen to the raw-data of its neighbor $m_k$. These estimates of $c_n$ are more realistic as they consider enumerations of all singleton combinations of raw nodes and in a minimal set cover of the network, most of the nodes are covered by single neighbors. In general the aggregating node n will observe a rate reduction ratio $c_n \leq c_{n,k}$ if node $m_k$ is selected as an raw node with radio range at least $\mathrm{dist}(n, m_k)$ (the distance between n and $m_k$).

2.2.3 Weighted Set Cover Formulation

In some implementations, a node n can choose to be a raw node with exactly $\alpha_n = |N_R^{max}(n)|$ choices of radio ranges or can be an aggregating node with $\alpha_n$ choices for rate-reduction ratios $c_n$. These choices can be interpreted as $2\alpha_n$ weighted disks (e.g., sets of vertices) centered at each node n. Further a disk can be referred to as a r-disk if it corresponds to choosing node n to be a raw-data node, otherwise, a disk can be referred to as an a-disk. The $k^{th}$ r-disk on a node n has a non-zero radius $R_n^k$ and covers all nodes in the closed neighborhood $N_{[R_n^k]}(n)$. An a-disk has radius=0 and has empty neighborhood (i.e it does not cover any vertex of the network). In some implementations, first $\alpha_n$ disks at each node n are r-disks and remaining $\alpha_n$ disks are a-disks. The weight of the disks is $$w_{n,k} = \begin{cases} B_r f(n, R_n^k) & \text{if } 1, , k, , \alpha_n \\ c_{k-\alpha_n}^n B_r g(n) & \text{otherwise} \end{cases} \quad (11)$$

where $w_{n,k}$ is the weight of $k^{th}$ disk at node n and is equal to the cost of routing data from node n to the sink, if $k^{th}$ disk is selected. Lets consider a sub-collection C of these disks which satisfies following restrictions:

1. Set Cover: The union of selected disks C should cover entire graph (all vertices). Since the disks corresponding to the nodes selected as aggregating nodes are empty, the union of neighborhoods of raw-nodes should form a set cover (i.e., $$\bigcup_{m \in D} N_{[m]} = I)$$

2. One disk per node: This means each node n can choose only one of these $2\alpha_n$ disks available to it.

$$\sum_{k=1}^{2\alpha_n} \chi_n(k) = 1 \quad (12)$$

where $\chi_n$ is the indicator function.

3. Coupling restriction: The coupling constraint at node n forces the $k^{th}$ neighbor $m_n^k$ of node n to be a raw-node with a radius $R_n \geq \mathrm{dist}(n, m_n^k)$ if node n chooses to be an aggregating node with rate-reduction ratio $c_n^k$, i.e.

$$\left(\chi_n(k + \alpha_n) - \sum_{l=l_0}^{\alpha_n} \chi_{m_n^k}(l)\right), , 0 \quad (13)$$

where $k \in \{1, \ldots \alpha_n\}$, and $l_0$ is the index of first disk at node $m_n^k$ that covers node n.

Thus the goal of optimization is to choose such a sub-collection C with minimum total weight. This can be defined as a Restricted Minimum Weighted Set Cover (RMWSC) problem:

Definition 3 Restricted Minimum Weight Set Cover (RMWSC) Problem: Given a set of nodes $v \in I$, let $W = \{\{w_{n,k}: k \in \{1, 2, \ldots, 2\alpha_n\}\}: n \in \{1, 2 \ldots N\}\}$ be the collection of set of weights for the disks at each node as defined above. A restricted set-cover C is a collection of weighted disks that forms a set cover and satisfies the restrictions given in (12) and 13. The RMWSC problem is to find a restricted set-cover with minimum total Cost.

$$\mathrm{Cost} = \sum_{n=1}^{N} \sum_{k=1}^{2\alpha_n} w_{n,k} \chi_n(k) \quad (14)$$

This problem of finding a set-cover is NP-hard in general. A technique can find an approximate solution to RMWSC problem, such a technique can include centralized algorithm or a distributed algorithm. Distributed algorithms can be robust to network topology changes and failures since the nodes readjust their parameters by local communications to find a new set-cover.

2.2.4 Linear Programming Optimization

The LP-formulation for MWSC problems is already well-known. Here we extend these ideas to our RMWSC problem. For this we denote by $L_c = 2\Sigma_{v \in I} \alpha_v$, the total number of possible disks. We define a cost vector c as $c = [c_1, c_2, \ldots, c_N]$ where $c_n$ is the cost function vector for node n i.e. $c_n = [w_{n,1}, w_{n,2}, \ldots w_{n,2\alpha_n}]$. Thus c is a $L_c \times 1$ size vector containing weights of all possible disks at all nodes. Note that this way we implicitly number the disks from 1 to $L_c$ such that the weight of $q^{th}$ disk is c(q). The solution vector $x_0$ is a binary vector of size $L_c \times 1$ such that $x_0(q) = 1$ implies that disk q is selected. For the set-cover constraints, we define a set-cover matrix A of size $N \times L_c$ such that $A(n, q) = 1$ if node n is covered by disk q. Further for the one disk per node constraints, we define matrix $A_{eq}$ of size $N \times L_c$ such that $A_{eq}(n, q) = 1$ for all disks q centered at node n.

Finally for the coupling constraints we define another matrix B of size $L_c/2 \times L_c$ such that each row of B is the coupling constraint of (13) on an a-disk of a node (hence the row size of matrix $B = L_c/2$). Thus $B(q_1, q_1) = 1$ and if disk $q_1$ corresponds to $k^{th}$ a-disk of a node n then $B(q_1, q_2)=-1$ for indices $q_2$ corresponding to all r-disks of node $m_n^k$ (i.e., $k^{th}$ nearest neighbor of node n) that cover node n. The Integer-Programming (IP) formulation of RMWSC problem can now be defined as in Formulation 1.

Formulation 1 (RMWSC Problem) Find a solution vector $x_0$ which minimizes $$c^t \cdot x_0 = \sum_{s=1}^{L_c} c(s) \cdot x_0(s)$$

subject to the following constraints $A \cdot x_0 \geq 1_N$ (set cover), $A_{eq} \cdot x_0 = 1_N$ (one disk per node), $B \cdot x_0 \leq 0$ (coupling constraint), and $x_0(s) \in \{0,1\}$ (integerality constraint).

Note that every solution of this problem is a feasible restricted set-cover and every restricted set-cover on I is a feasible solution of this problem. Therefore the optimal value of this problem is equal to RMWSC. Since IP formulation is NP-Hard, we find LP relaxation solution, which has same formulation as in Formulation 1 except that solution vector x is now real and $x \in [01]^N$. This gives us an linear optimal solution vector $x^* \in [01]^N$. So we need a way to round this fractional solution to an integral one. Our idea of rounding is to pick that disk at each node for which the corresponding entry in solution vector x is maximum among all disks on that node. If there is a tie we pick the disk with larger radius to maintain set-cover constraint. Note that although LP-relaxation solution vector $x^*$ is guaranteed to be a restricted set-cover, the rounded vector, $x_0$ may not provide a set-cover. It does However, select one disk per node and hence satisfies those constraints. In this case, for every node n which is not covered by integer solution $x_0$ (i.e. $Ax_0=0$), we find the set of all raw-data neighbors in the $R^{max}$ radius of node n and choose the neighbor which can cover the node n by increasing its radio range by minimum increase in cost. This gives us a centralized set-cover solution.

2.3 Distributed Set Cover Algorithms

Distributed Set Cover Algorithms can reduce the number of required communications between nodes and dynamically adjust a node's radio range. Such algorithms can use distributed heuristics for computing the raw-aggregating node assignments based on information gathered locally by every node in its 1-hop neighborhood. A distributed set covering algorithm is described below which is constructed from a fixed set of radio ranges, using only information gathered locally in the 1-hop neighbor. Also described below are distributed modification algorithms which reduce the size of these set coverings by allowing each node to increase its radio range.

2.3.1 Distributed Heuristic for Minimum Set Cover

RANA optimization technique can include assigning as raw data nodes the ones with greater outdegree in the network and forcing their neighbors to become aggregating nodes. This can be performed in a distributed way by allowing each node to exchange a few messages with its neighbors and then decides between becoming a raw or aggregating node. The technique can include determining a number of neighbors at each node, exchanging outdegree information, and sequentially performing one or more raw-aggregating assignments.

FIG. 5 shows an example of an algorithm based on a distributed heuristic for a minimum set cover. The algorithm of FIG. 5 shows the operations of such an algorithm for a single node. In a WSN, multiple nodes will be running this algorithm to determine their node types in a distributed and cooperative fashion. After scheduling transmissions between adjacent sensors to avoid interference, each node broadcasts a pilot signal which includes its transmit power level. After listening for pilots, each node broadcasts an acknowledgment packet at the maximum radio range of the pilots it has received. The outdegree from each node is broadcast to its neighbors. The outdegree of a node is the number of acknowledgment it receives. For example, based on a node receiving 3 acknowledgments, the node's outdegree is 3. The nodes decide between becoming a raw or aggregating node. In this deciding process, the nodes run random timeouts during which they listen to their neighbors becoming raw-nodes. If a node becomes a raw-node, the node broadcasts information including its label (such as a node identifier or a MAC address) and a type status (status indicating that "I am a raw node" or "I am an aggregation node"). If one node hears a neighbor declaring that it has become a raw node, it assigns itself as aggregating and broadcasts its label. Otherwise, once the timeout is over, the node compares its outdegree with that of its neighbors. If its out-degree is greater than the out-degree of its unassigned neighbors, then node declares itself raw-node and transmit its label. Otherwise it restarts another timeout and listens to one of its unassigned neighbors turning into a raw node.

2.3.2 Distributed Set Cover Modifications

FIGS. 6A, 6B, 6C, and 6D shows examples of distributed set-cover modifications. Based on allowing one or more nodes to increase their radio ranges, an assignment given by the algorithm of FIG. 5 can be improved. In these figures, blue squares are raw nodes, red circles are aggregating nodes. An arrow from square to circle indicates that the raw-node (square) covers the aggregating node (circle). If in FIG. 6A, node n increases its radio range from $R_n^1$ to $R_n^2$, it will be able to cover more nodes as shown in FIG. 6B. If in FIG. 6C, node n switches from aggregating to raw node and increases its radio range, then it is able to reduce the size of the set cover as shown in 6D.

In FIG. 6A, the radio range of raw node n is changed from $R_n^1$ to $R_n^2$ since by doing so it can cover raw-nodes k and m, both of which in-turn become aggregating (see FIG. 6B). There are no raw-nodes created as nodes k and m were only connected to aggregating nodes which were either already covered by node n with radio range $R_n^2$ or are being covered by other raw-nodes in the network.

In FIG. 6C, aggregating node n is changed to be a raw-node since by doing so, it now covers 3 raw-nodes $n_1$, $n_2$ and $n_3$, which then become aggregating (FIG. 6D). Again we make sure that doing this does not create extra raw-nodes since the aggregating nodes which are neighbors of $n_1$, $n_2$ and $n_3$ are already covered by other raw-nodes. Below we describe how to make these decisions by considering a local cost heuristics.

Assuming that each node m operates in a radio range within the interval [$R_m^{min}$, $R_{max}$], it may be worth increasing the initial $R_m^{min}$ of some sensors to cover other raw nodes. This will allow those raw nodes to become aggregating nodes, and will reduce the amount of uncompressed data that is transmitted to the sink. Even though the increase in radio range will lead to an increase in communication cost, this can be compensated with the compression of data in the newly assigned aggregating nodes.

For each raw node m let $D_m$ denote the set of raw nodes that can overhear m's data when node m increases its transmission radio range from $R_m$ to $\bar{R}_m$. In this case node m is able to cover some other raw data nodes, and it may be worthwhile to flip these raw nodes to aggregating nodes while increasing node m's radio range. Assuming the same notation as in Sec. 2.2, the cost of routing data towards the sink from both m and $\bar{D}_m$ will switch from (15) to (16).

$$C_1 = B_r(R_m^2 + g(\rho(m))) + \sum_{n \in \bar{D}_m} B_r g(n) \quad (15)$$

$$C_2 = B_r\left(\bar{R}_m^2 + g(\bar{\rho}(m))\right) + \sum_{n \in \bar{D}_m} c_n B_r g(n) \quad (16)$$

On the other hand, it may be also worth to increase the radio range of an aggregating node m, to switch its assignment to raw node, and to allow it to cover some present raw data nodes in the set $\bar{D}_m$. In this case, there is a reversal of roles between node m and nodes in $\bar{D}_m$. Now, the overall cost of routing data towards the sink from all the involved nodes will change from (17) to (18).

$$C_3 = c_m B_r(R_m^2 + g(\rho(m))) + \sum_{n \in \bar{D}_m} B_r g(n) \quad (17)$$

$$C_4 = B_r\left(\bar{R}_m^2 + g(\bar{\rho}(m))\right) + \sum_{n \in \bar{D}_m} c_n B_r g(n) \quad (18)$$

For gaining additional savings in terms of cost, (15) (resp. (17)) must be greater than (16) (resp. (18)). In other words, each node needs to find the radio range $\bar{R}_m$, among its quantized values as defined in Sec. 2.2, that maximizes the difference $\delta = C_1 - C_2$ (resp. $\delta = C_3 - C_4$). By choosing $\bar{R}_m$ in this way, the total cost will always go down. Thus, these heuristics will converge to a local minimum.

We have observed that for uniformly deployed networks is better to first let the current raw data nodes check if by changing their radio ranges they can improve the present set cover, and then do the same with the aggregating nodes. On the contrary, for clusterized networks is better to do it in the reverse order. However, in both ways, for implementing this modification as a distributed algorithm, first of all nodes will need to get or approximate the $c_n$ values. The routing cost $g(m)$ and $g(n)$ for each $n \in \bar{D}_m$ is be exchanged. To avoid this cost for learning and exchange, a WSN can use approximations to these values by using information available at node m.

In addition to the cost approximations, after each change in raw-aggregating assignment we need to check that a set cover still exists. Note that these changes in assignment are done one node at a time, so it is only necessary to check for a set cover within two hops of each node (i.e., checking is localized). In the first case, when a raw node is flipped to become an aggregating node, we need to check that the neighbors of any raw node that has been flipped is still covered. In the second case when an aggregating node is flipped to be raw and some of its raw neighbors are flipped to be aggregating, the neighbors of any raw node that is flipped must still be covered.

2.3.3 Approximation-Based Modification Techniques

Approximation-based modification techniques can optimize a RANA. Such techniques can use approximations to the cost equations (15)-(18) that allow nodes to improve the original set cover resulting from Section 2.3.1 by using only information that they have locally available. In some implementations, nodes can assume that the rate reduction ratio $c_n$ is a constant value c between (0, 1) for all neighbors (for example, c=0.5). In some cases, the difference in terms for routing cost between the current parent in the tree and the one after the increase in radio range is negligible, e.g., $g(\rho(m)) \approx g(\bar{\rho}(m))$.

Note that in fairly dense networks, node m will often be located near the center of its neighbors in $\bar{D}_m$. Thus, the average routing cost of nodes in $\bar{D}_m$ will be similar to the cost at node m, i.e., $g(m) \approx \sum_{n \in \bar{D}_m} g(n)/|\bar{D}_m|$. Thus, $\sum_{n \in \bar{D}_m} B_r g(n) \approx B_r |\bar{D}_m| g(m)$ and $\sum_{n \in \bar{D}_m} c_n B_r g(n) \approx c B_r |\bar{D}_m| g(m)$. Thus, $$\bar{C}_1 = B_r(R_m^2 + g(\rho(m))) + B_r |\bar{D}_m| g(m) \quad (19)$$

$$\bar{C}_2 = B_r(\bar{R}_m^2 + g(\rho(m))) + c B_r |\bar{D}_m| g(m) \quad (20)$$

$$\bar{C}_3 = c B_r R_m^2 + g(\rho(m))) + B_r |\bar{D}_m| g(m) \quad (21)$$

$$\bar{C}_4 = B_r(\bar{R}_m^2 + g(\rho(m))) + c B_r |\bar{D}_m| g(m) \quad (22)$$

Based on taking these approximations into consideration, and supposing the fact that all nodes already know their quantized radio range values, the distributed heuristics for improving the minimum set cover for both raw and aggregating nodes are given in the algorithms depicted by FIG. 7 and FIG. 8. FIG. 7 shows an example of an approximation-based distributed minimum set cover modification algorithm for raw data nodes. FIG. 8 shows an example of an approximation-based distributed minimum set cover modification algorithm for aggregating nodes. Note that each node m only uses information that it has available to decide its radio range, e.g., (19)-(22) are only functions of information available at node m. While this relies on some approximations, it significantly reduces the amount of coordination needed to implement these modifications in a distributed manner. All that needs to be checked is if a set cover still exists.

In worst case scenario the number rounds of communications needed to execute algorithms of FIGS. 7 and 8 in the network is $O(d_{max})$ per node, where $d_{max}$ is the maximum outdegree of the nodes. This can be observed since in order to change its parity each node needs to transmit with at most $d_{max}$ radio ranges. For bounded degree networks the order of communications complexity is therefore O(N).

The algorithms of FIG. 5, FIG. 7, and FIG. 8 can be executed one after another. This is implemented using another set of timeouts in network and in each timeout period nodes execute an assigned distributed task. By doing the algorithms described above, nodes can verify if it is worth to increase its radio range just by knowing how many raw data nodes can they cover. These distributed heuristics still reduce the number of raw data nodes in the network while they are suitable in a practical setting due to the low number of additional communications needed.

2.4 Simulations

In this section, the performance of various distributed MSC techniques are compared against against a centralized assignment algorithm based on unidirectional graph-based transforms as described herein, a Haar-like tree-based transform, and a cluster-based KLT. For performance evaluation, we use simulated data to generate using a second order AR model. This data is (multi-variate) Gaussian distributed. The nodes were placed in a 600×600 grid. The data value at each node corresponds to the value from the associated position in the grid. A shortest-path routing tree (SPT) which minimizes the sum of squared distances to the sink node is used for routing. We measure energy consumption using the cost model for WSN devices where the energy consumed in transmitting k bits over a distance D is $E_T(k, D)=E_{elec} \cdot k + \epsilon_{amp} \cdot k \cdot D^2$ Joules and the energy consumed in receiving k bits is $E_R(k)=E_{elec} \cdot k$ Joules. The energy dissipated by radio electronics to process k bits is given by $E_{elec} \cdot k$. The routing-driven compression methods used for these simulations use a lifting transform, such as those described herein. A lifting transform can compute prediction residuals for each aggregating node using the data received from raw node neighbors, and the prediction filters are adapted over time.

For these simulations, transform coefficients are quantized using a dead-zone uniform scalar quantizer and are encoded using an adaptive arithmetic coder. Performance in all cases is measured by the trade-off between the total energy consumption at each quantization level and reconstruction quality measured by the signal-to-quantization-noise ratio (SNR) expressed in dB. Higher SNR (for a fixed cost) implies higher fidelity reconstruction of the original data, and a difference of 1 dB in SNR translates to a decrease by a factor of 10 in MSE.

For the cluster-based KLT, the network can be divided into clusters using k—means clustering. This choice of clustering is based on the analysis in Section 2.1.3 which shows that, under the approximations and assumptions given there, k—means clustering is a good algorithm for finding an assignment that minimizes the total cost. Once the clusters have been defined, we compute the KLT in each cluster using the normalized linear mean square (NLMS) filters. We use a KLT since it is the optimal (orthogonal) transform for representing stationary, Gaussian data. Note that each KLT is estimated using actual data, and in a real system implementation those transform matrices would need to be forwarded to the sink so that each KLT can be inverted. We choose to ignore the cost for transmitting those matrices for the sake of simplicity. For each cluster, we choose the cluster-head as the node closest to the centroid of the cluster, form an SPT rooted at each cluster head, and route data from raw nodes to each cluster-head along each SPT. Finally, once cluster-heads gather data from the raw nodes in their cluster, they compute a KLT, encode the transform coefficients, and transmit them to the sink along an SPT.

Figure 9B:
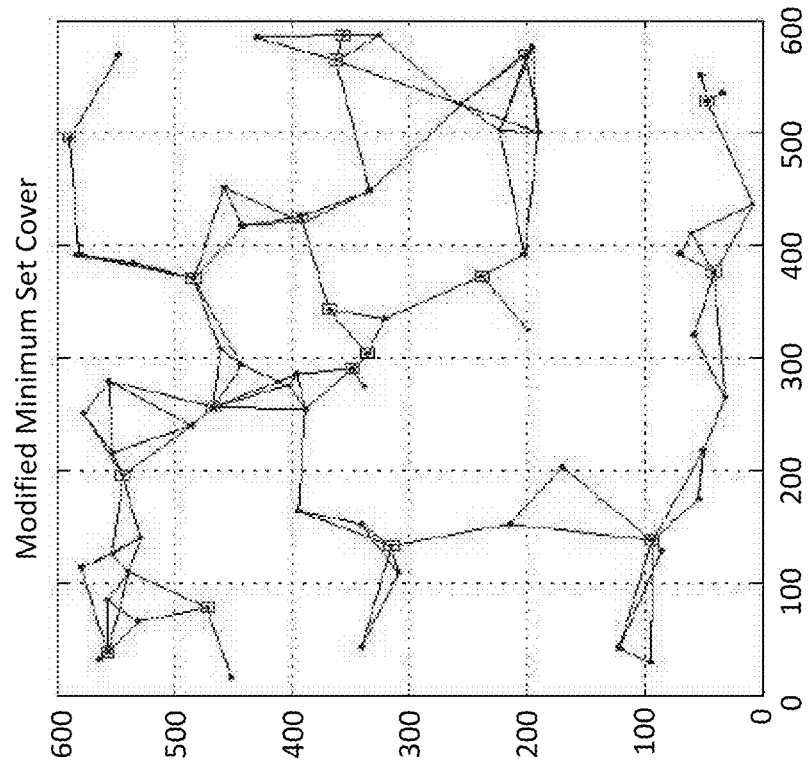
Figure 9A:
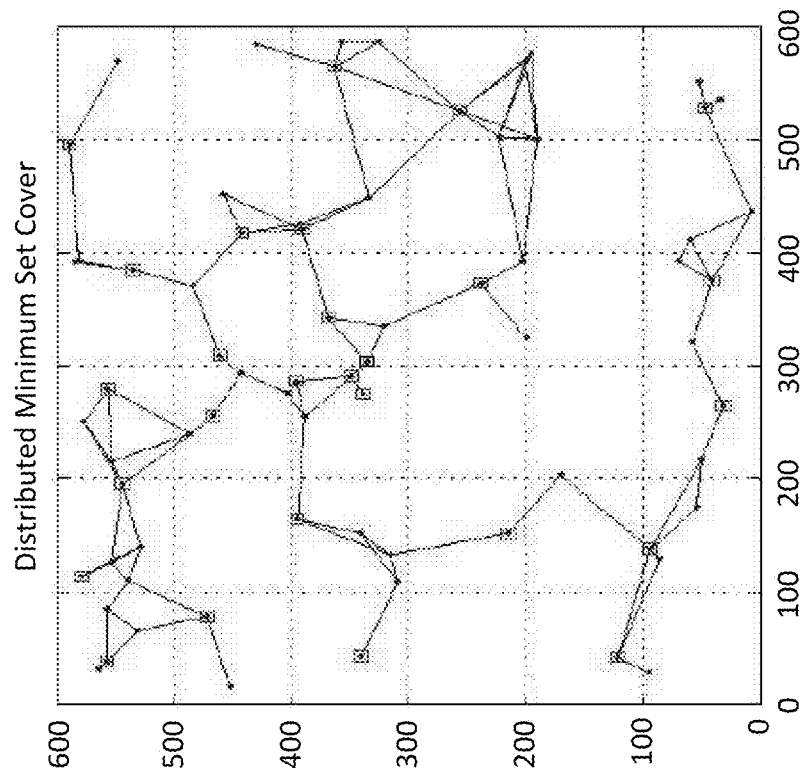

FIGS. 9A, 9B, 9C, and 9D shows different example configurations of a wireless sensor network based on different optimization techniques. These figures show minimum set covers of a 70 node network. FIG. 9A shows a configuration for a distributed minimum set cover. FIG. 9B shows a configuration for a modified distributed minimum set cover with exact values for $c_n$ and g(n). FIG. 9C shows a configuration for a approximation based modified distributed minimum set cover with approximate values for $c_n$ and g(n). FIG. 9D shows a configuration for a LP-optimized set cover.

Figure 10:
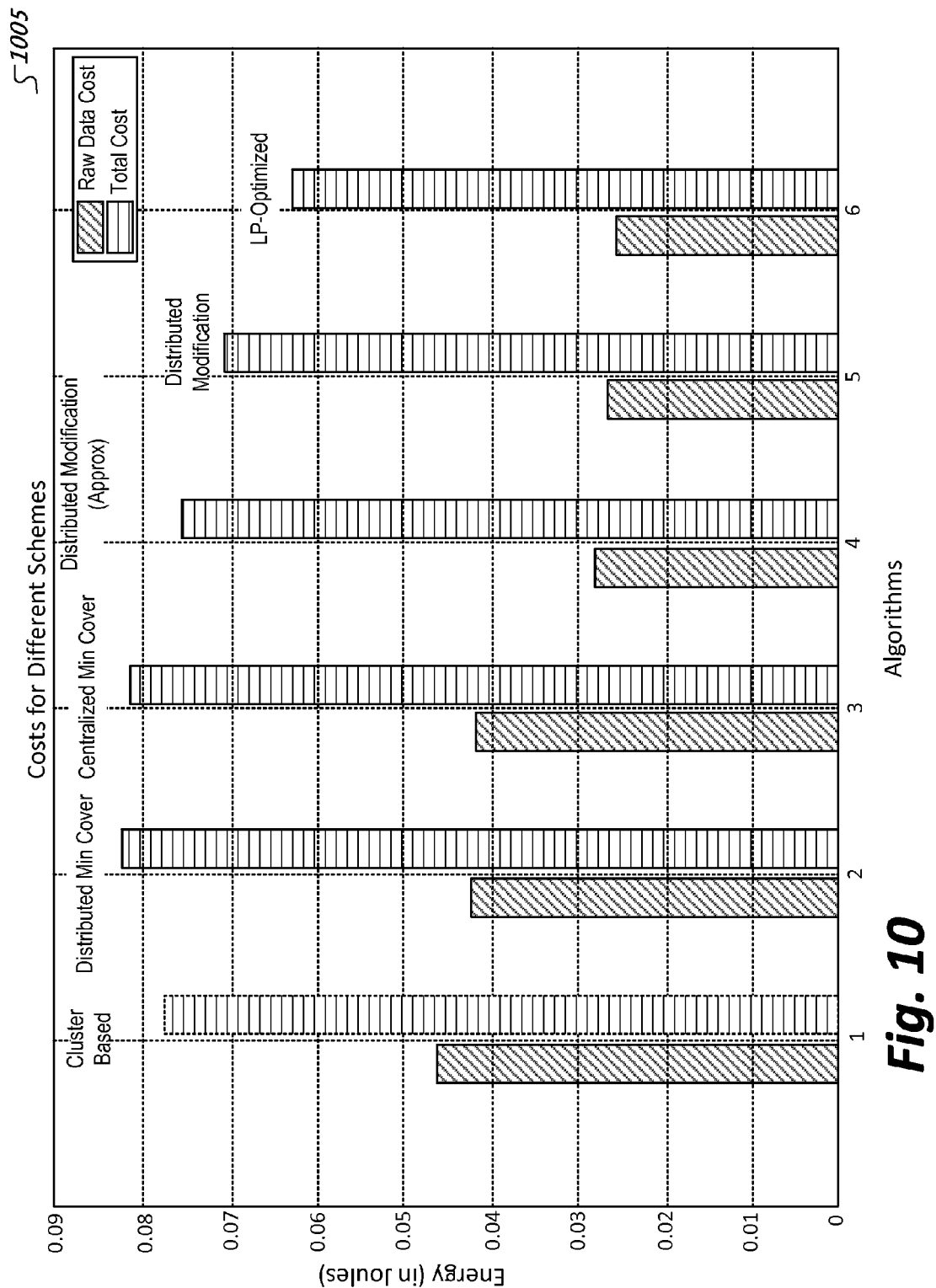
FIG. 10 shows examples of raw-costs and total costs for different set covering algorithms.

FIG. 10 shows examples of raw-costs and total costs for different set covering algorithms. A graph 1005 shows the raw-data cost and total cost for various techniques: cluster based, Mistributed Min Cover, Centralized Min cover, Distrbuted Modification (Approx), Distributed modification, and LP-optimized). It can be seen the graph 1005, that except clustering based method the total cost in the network is higher for an algorithm if its raw data cost is higher, with the LP-optimized solution providing lowest raw-data cost and hence total cost. For clustering based method cluster-heads send compressed data for all other nodes in their clusters to the sink, while in other methods raw-nodes send their raw-data all the way to the sink. So for clustering methods even though the raw-cost is high, the network has lower over-all cost than routing-driven methods.

Figure 11:
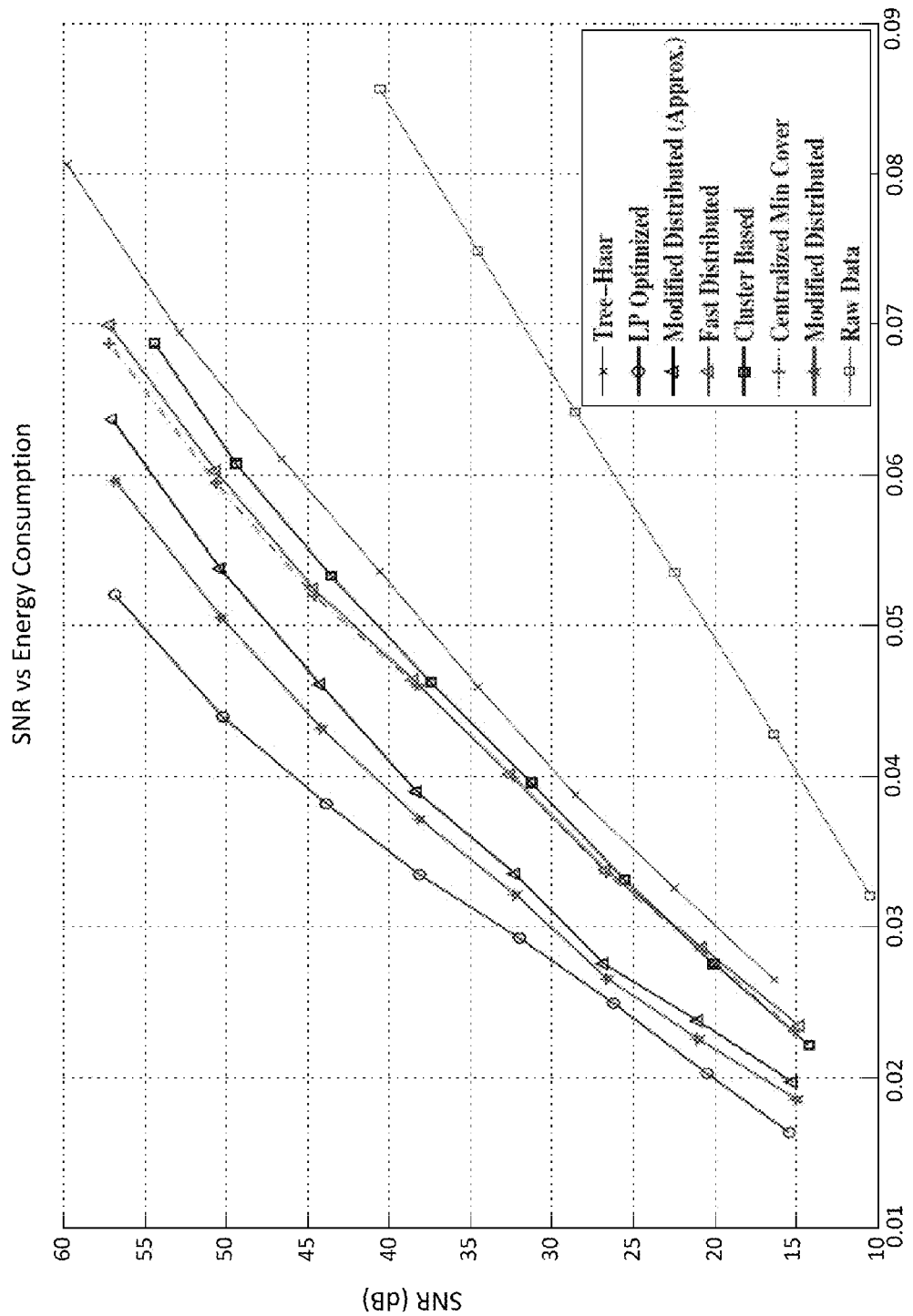
FIG. 11 show examples of cost-distortion curves for different set covering algorithms.

FIG. 11 shows examples of cost-distortion curves for different set covering algorithms. The cost versus distortion curves are shown in FIG. 11. The cost-distortion curve for the centralized set cover, which is based on unidirectional graph-based transforms as described herein, is shown (see centralized Min Cover) as a point of reference, as is a cluster-based KLT. The cluster-based KLT gives better performance than simple raw data transmission, but still performs worse than the routing-driven compression schemes. This is mainly because (i) this cluster-based scheme has many raw data nodes, and (ii) there are many data transmissions that are made away from the sink. In this network, the distributed set cover algorithm gives similar cost-distortion performance as the centralized set cover. The LP-optimized set cover does the best overall, as is expected. The exact and approximate modifications are second best and are nearly identical. More importantly, they significantly improve on the performance of the distributed set cover, with more than 5 dB increase in SNR for a fixed cost.

3 Unidirectional Graph-Based Transforms

A WSN can use a lifting-based distributed wavelet transform for any arbitrary communication graph. Moreover, Unidirectional transforms can be computed as data are forwarded toward the sink on a routing tree. Transmitting raw data bits along the routing trees in a WSN typically requires more bits than transmitting encoded data. Thus, it is advantageous to minimize raw data transmissions in the network. Lifting based distributed wavelet transforms are useful since they are invertible as long as, given an arbitrary even and odd splitting, data from odd nodes is only processed using data from even nodes and vice versa. Moreover, even nodes play the role of raw data nodes and odd nodes play the role of aggregating nodes. Therefore, a transform design can seek to find invertible, energy-efficient lifting transforms by finding even and odd splittings which minimize the number of even (i.e., raw data) nodes. Such designs will implicitly minimize the number of nodes which must transmit raw data, therefore leading to transforms which are most energy-efficient overall. Such designs construct an even/odd split of nodes which 1) minimizes the number of even nodes while ensuring that at least one even node is in the vicinity of each odd node and 2) minimizes the cost of raw data transmissions per even node. A WSN can use a transmission scheduling for sensor nodes that make transform computations unidirectional.

General construction of lifting wavelet transforms on network graphs, and how to make these transforms unidirectional is now described. Let G=(V, E) be a directed communication graph of a WSN with N nodes indexed by n∈l={1, 2, . . . , N}, with the sink node having index N+1 and where each edge (m, n)∈E denotes a communication link from node m to node n. Let T=(V, $E_T$) be a routing tree in G along which data, denoted by x(n), flows towards the sink. Let depth(n) be the number of hops from n to the sink on T and let $\rho_n$ denote the parent of n, $C_n$ the set of children of n and $D_n$ the descendants of n in T. Also let $A_n$ denote the set of nodes that n routes data through to the sink excluding the sink, i.e., ancestors of n. Finally, let E and O denote some arbitrary set of even and odd nodes respectively.

Lifting based wavelet transforms can use a set of conditions for a distributed lifting transform to be unidirectional (e.g., the transform can be computed along T as data is routed towards the sink). Given a transmission schedule which assigns a time slot to each node to transmit its own data along routing tree T, a transform has unidirectional operation if each node n can compute its coefficients using only data received from the nodes which transmit before node n (data from descendants $D_n$ and broadcast neighbors $B_n$), and n does not forward data from its broadcast neighbors, i.e., $m \in B_n - D_n$. In case of lifting this means that the transform is unidirectional as long as each even node transmits its data before all of the odd nodes which are connected to it.

In some WSNs, all even nodes transmit their data first according to their depth in the routing tree, followed by odd nodes according to their depth in the tree. This way odd nodes gather all the data they need to compute their predictions before transmitting their own data. This can increase the network delays as the nodes may have to transmit their own data and data from their ancestors in different time slots. However cost-wise it would make no difference since each node is transmitting its own data only once. Linear prediction operators $p_n$ and update operators $u_m$ at nodes $n \in O$ and $m \in E$, respectively can be designed in a variety of ways. A WSN can use NLMS filters which adapt the spatial prediction filters over time. NLMS filters converge to optimal filters over time by gradually minimizing prediction errors. Given the even/odd split in the graph, let $N_n$ denote the set of transform neighbors for all nodes n, where $N_n \subset O$ for $n \in E$ (i.e., even nodes only have odd neighbors) and $N_m \subset E$ for $m \in O$ (i.e., odd nodes only have even neighbors). Then for each $m \in O$, detail coefficient d(m) can be computed as:

$$d(m) = x(m) - \sum_{k \in N_m} p_m(k) x(k) \qquad (23)$$

Note that if the prediction $\Sigma_{k \in N_m} p_m(k) x(k)$ is close to x(m), then d(m) will have small magnitude and so can be encoded using fewer bits than that those that would be needed for raw data x(m). This will ultimately lead to cost reduction for odd nodes since they transmit fewer bits per coefficient. An update step can also be computed for data from each even node to produce smooth coefficients, but the number of bits needed to encode smooth coefficients is typically the same as the number of bits needed for raw data. Therefore, in this work even nodes do not compute any update coefficients.

In some implementations, the splitting is based on depth (e.g., odd depth nodes are odd, even depth nodes are even). In this case, all even nodes forward raw data one hop to their odd parents, odd parents compute predictions, then odd parents update data from their even children. Since splitting is based on depth, roughly half of the nodes will be even, thus, roughly half of the nodes transmit raw data. This large number (50%) or raw data nodes is due to the splitting on the tree, which has roughly half even depth nodes.

Node partitions (e.g., even or odd) can be determined which minimize cost of transmissions. In case of the unidirectional transform described above this problem boils down to minimizing the number of even nodes in the network. In addition, order to reduce the energy of prediction residues (which leads to lower bit-rate) we want each odd node in the network to have at least one even node in its neighborhood to compute its detail coefficients. Given the radio ranges of the nodes, this becomes a set covering problem on directed communication graph. The radio ranges affect the number of neighboring nodes, and thus size of the set-cover. As a first stage we fix the radio range of each node to the minimum value that guarantees that a node can transmit data to its parent in the routing tree.

Set Covering Problem: For Graph G=(V, E) denote closed neighborhood $n_{[v]} = n_{[v]} = \{v\} \cup \{u \in V : vu \in E\}$ for all nodes $v \in V$. Given a collection N of all sets $\{n_{[v]}\}$, a set-cover $C \subseteq N$ is a sub collection of the sets whose union is V. The set-covering problem is, given N, to find a minimum-cardinality set cover.

In our case the neighborhood $n_{[v]}$ for node v is set of all nodes within the radio range of node v. Once we obtain a set-cover $C = \{n_{[v_j]}\}_{j \in 1, 2, \ldots p}$, we denote set $\{[v_j]\}_{j \in 1, 2, \ldots p}$ as even nodes and remaining nodes as odd nodes. The problem in this form is also referred to as dominating set problem. Set-covering problem for unweighted undirected graphs is NP-hard in general. However it can be solved by a natural greedy algorithm that iteratively adds a set that covers the highest number of yet uncovered elements. It provides a good approximation and can be implemented in a distributed way. The algorithm is same for directed graphs with the exception that sets with highest outdegree of central node are added first to the cover. FIG. 12 shows an example of an algorithm for choosing a greedy set cover in an unweighted directed graph.

FIG. 13 shows an example of an algorithm for choosing a greedy set cover in a weighted vertex directed graph. In the weighted set-covering problem, for each set $n_{[v]} \in N$ a weight $w_v \geq 0$ is also specified, and the goal is to find a set cover C of minimum total weight. In the context of our problem weight $w_v$ for node v is the total cost of transmitting raw data from node v to the sink along the routing path. The greedy algorithm for weighted set cover builds a cover by repeatedly choosing a a set $n_{[v]} \in N$ that minimizes the weight $w_v$ divided by number of elements in $n_{[v]}$ not yet covered by chosen sets.

Figure 14:
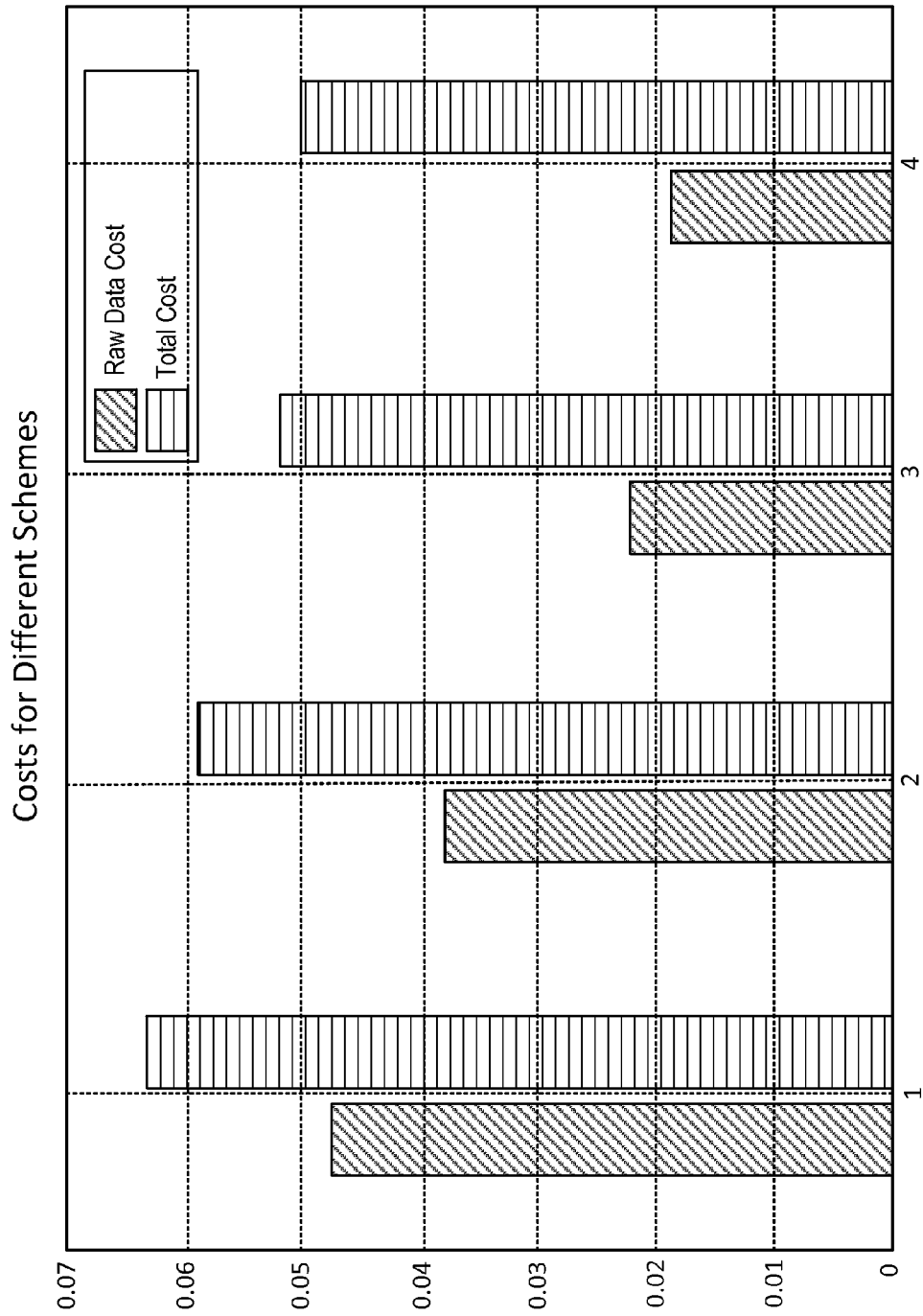
FIG. 14 shows an example of cost comparisons of different lifting schemes.

FIG. 14 shows an example of cost comparisons of different lifting schemes. A transform with a Haar-like tree-based split (Transform A) and an extension of this transform where odd nodes perform additional levels of decomposition on data received from their even children (Transform B) are compared with the unidirectional transforms with graph-based splits described herein. The described transforms include unweighted set cover based even/odd split on graph-based splits (Transform C) and weighted set cover based even/odd split on graph-based splits (Transform D). The transforms use a data adaptive prediction filter design. In this graph 1405, the raw data cost and a total cost is shown for each transform. The cost of raw data transmissions for the weighted set cover based split (Transform D) is lower than the cost of raw data transmissions for unweighted set cover based split (Transform C). This is to be expected since even nodes selected by weighted set cover algorithms now have lower costs of transmitting data to the sink.

Figure 15:
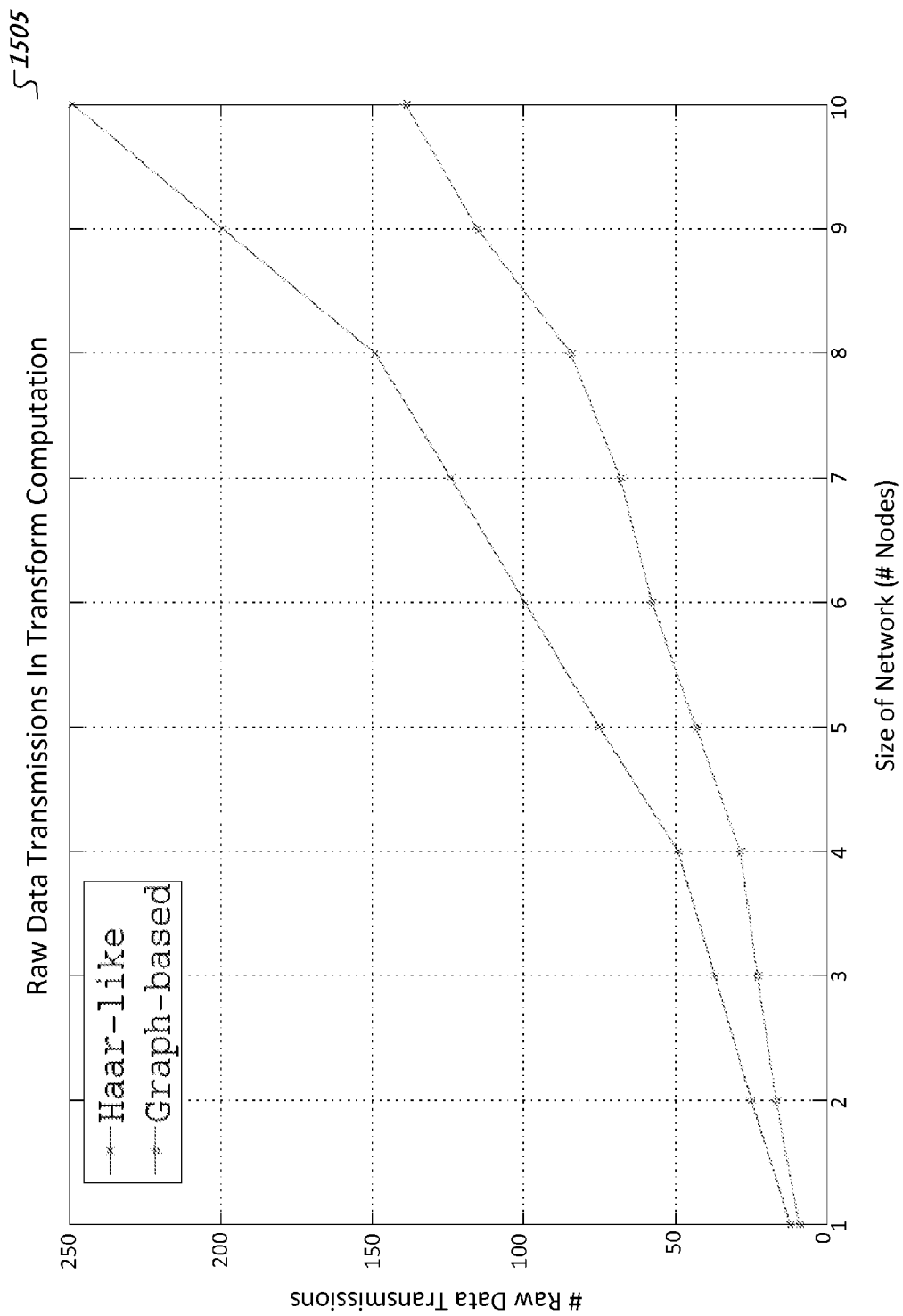
FIG. 15 shows an example of raw data transmissions required by different lifting schemes.

FIG. 15 shows an example of raw data transmissions required by different lifting schemes. The graph 1505 shows, for networks of different sizes, the number of raw data transmissions taking place for a transform with a Haar-like tree-based split and the number of raw data transmissions taking place for a unidirectional transform with graph-based splits. As shown by the graph, graph-based splits leads to a significant reduction in raw data transmissions. Assuming a nearly uniform deployment of sensors, the distances between nodes are roughly equal. Hence reduction in the number of raw transmissions is directly proportional to the reduction in transmissions costs as shown in FIG. 14.

Figure 16A:
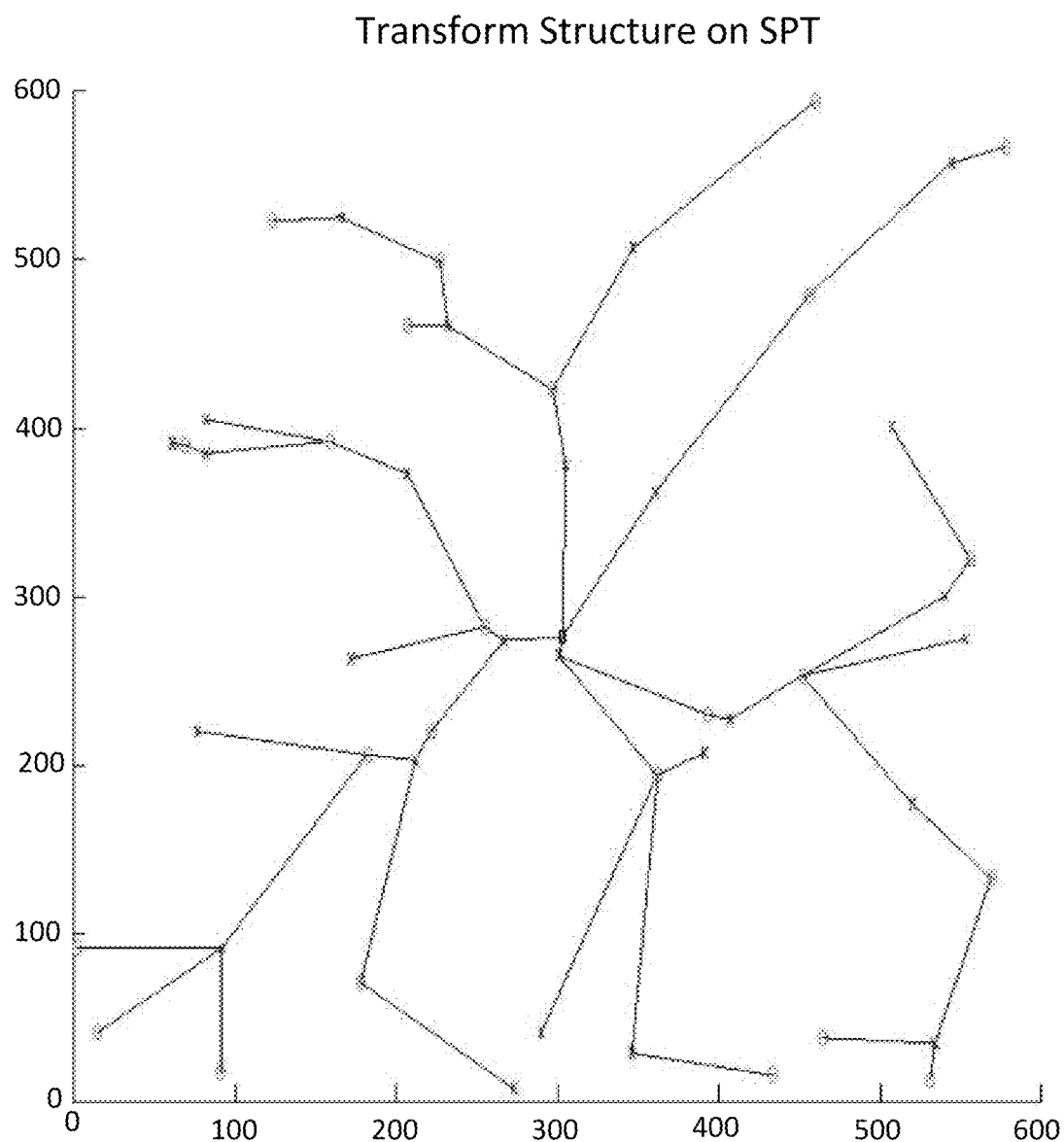
FIGS. 16A and 16B show examples of different transformation structures.
Figure 16B:
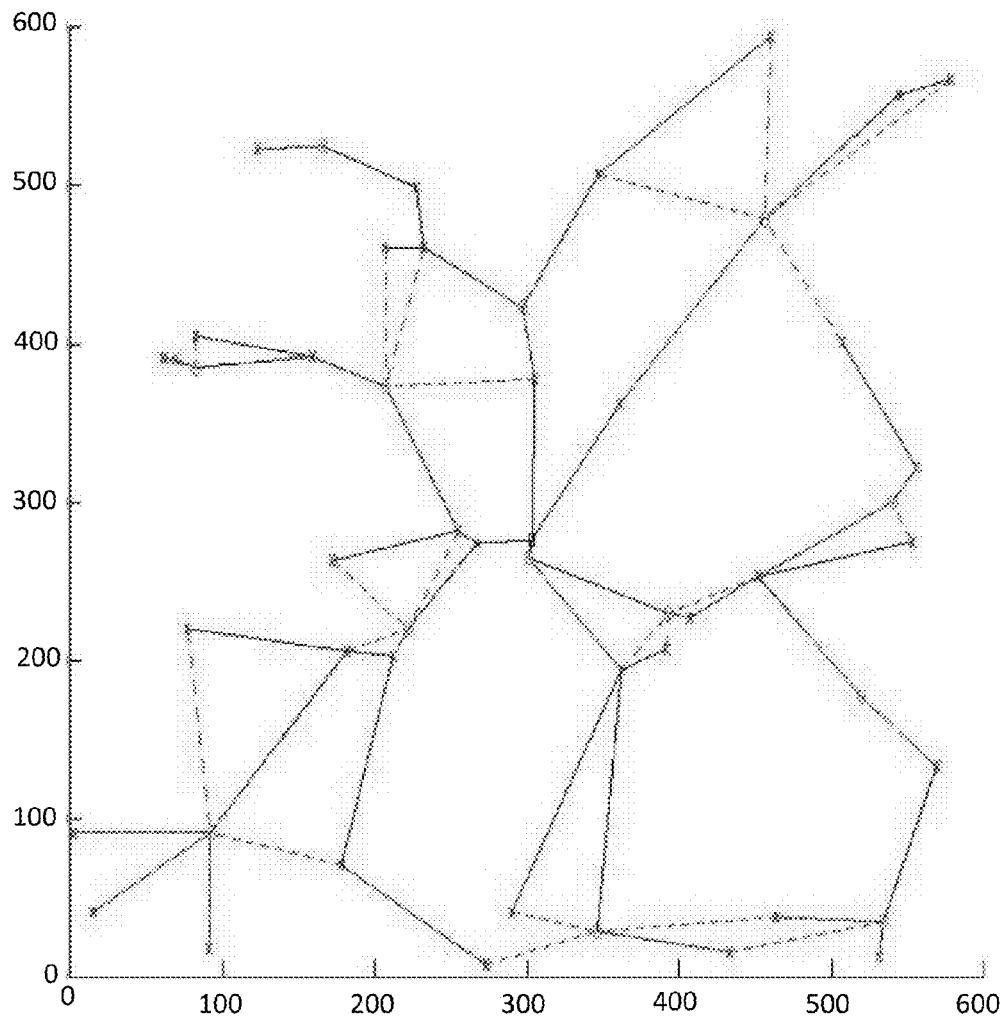

FIGS. 16A and 16B show examples of different transformation structures. In these figures, circles denote even nodes and x's denote odd nodes, the sink is shown in the center as a square, solid lines represent forwarding links, and dashed lines denote broadcast links. In these examples, an AR-2 model is used to generate noise-free simulation data with high spatial data correlation, e.g., the amount of data correlation between two nodes increases as the distance between them decreases. We also assume that raw measurements use 12 bits. FIG. 16A shows a transformation structure based on a shortest path routing tree. A randomly generated 50 node network and a shortest path routing tree (SPT) is computed and used for routing. The SPT is depicted based on an even and odd splitting. FIG. 16B shows a transformation structure based on graph-based splits. The graph depicts a transformation structure based on graph-based splits. Note that although both FIGS. 16A and 16B have the same underlying routing structure (solid lines), the number of required even nodes are lesser for a graph-based transform than a tree-based transform. This leads to reduction in raw-data transmission costs.

Figure 17:
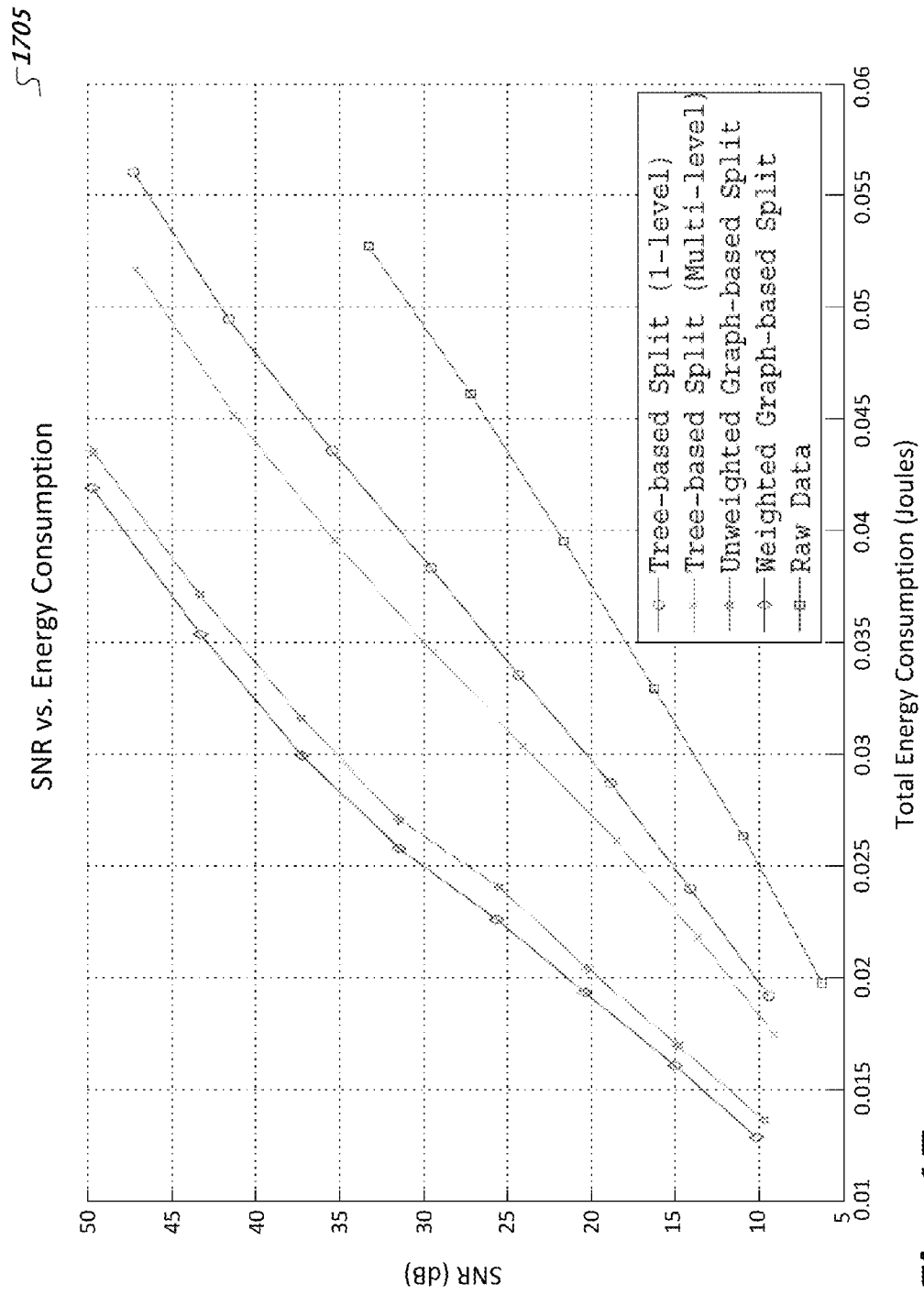
FIG. 17 shows an example comparing energy consumption for different lifting schemes.

FIG. 17 shows an example comparing energy consumption for different lifting schemes. The graph 1705 plots energy consumption versus reconstruction quality in terms of Signal to Quantization Noise Ratio.

Each point in the graph 1705 corresponds to a different quantization level with adaptive arithmetic coding applied to blocks of 50 coefficients at each node. The graph 1705 shows the energy consumption for a 1-level tree-based split, a multi-level tree-based split, an unweighted graph-based split, a weight graph-based split, and the raw data no-transformation base case. The two graph-based splits out performed the two tree-based splits, and, obviously, all four out performed the raw data no-transformation base cases.

The transforms based on graph-based splits perform better because these transformations seeks to minimize the number of nodes that transmit raw data to their neighbors, therein reducing the total energy consumed in the data gathering process. The transforms based on tree-based splits have roughly 50% raw data nodes, hence, they are not as efficient as the two transforms with graph-based splits (which have roughly 25% raw data nodes).

One or more of the described techniques can be applied to any arbitrary WSN, based on it being computed as the data are routed toward the sink. The schedule of computation and the even-odd assignment of nodes can be pre-fed into sensors at initialization. This transform design can be seen as precursor to a new class of algorithms which would focus on minimizing raw data transmissions in a WSN by jointly optimizing routing tree and even/odd partition (or raw nodes/aggregating nodes partition).

The disclosed and other embodiments and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method implemented by a local node in a wireless sensor network, the method comprising:
   transmitting, from the local node, a first pilot signal using a local power level that controls a radio range of signals transmitted from the local node;
   detecting, at the local node, one or more remote nodes included in the wireless sensor network, wherein detecting the one or more remote nodes comprises receiving one or more second pilot signals from the one or more remote nodes;
   transmitting a local outdegree to the one or more detected remote nodes, the local outdegree being based on a quantity of the one or more detected remote nodes;
   receiving one or more remote outdegrees from the one or more detected remote nodes;
   determining a local node type of the local node, wherein determining the local node type comprises (i) exchanging messages with at least a portion of the one or more detected remote nodes, the messages indicating a node type, (ii) selectively assigning the local node type as a raw type based on information comprising the local outdegree, the one or more remote outdegrees, and one or more of the messages, and (iii) selectively assigning the local node type as an aggregation type based on a neighbor node being of the raw type, wherein a node of the raw type sends raw data to a node of the aggregation type, wherein the node of the aggregation type aggregates and compresses raw data; and
   adjusting characteristics, including an energy usage characteristic and a data compression characteristic, of the wireless sensor network by (i) selectively modifying the local power level and (ii) selectively changing the local node type.

2. The method of claim 1, wherein the first pilot signal comprises an indication of the local power level, wherein the one or more received second pilot signals each comprise an indication of a power level, and wherein detecting the one or more remote nodes comprises:
   transmitting an acknowledgement message based on a maximum power level indicated by the one or more received second pilot signals; and
   receiving one or more acknowledgements from at least a portion of the one or more remote nodes.

3. The method of claim 2, wherein the local node type is the raw type, and wherein adjusting the characteristics comprises:
   increasing the local power level to increase the radio range to reach one or more additional remote nodes; and
   transmitting an additional signal at the increased local power level to cause at least a portion of the one or more additional remote nodes to become the aggregation type.

4. The method of claim 1, wherein adjusting the characteristics comprises performing an approximation-based distributed minimum set cover modification algorithm to change one or more node type assignments within the wireless sensor network to increase a data compression ratio.

5. The method of claim 4, wherein performing the approximation-based distributed minimum set cover modification algorithm comprises increasing the local power level to increase the radio range to reach one or more additional remote nodes.

6. The method of claim 1, wherein the node of the aggregation type is configured to perform a portion of a distributed wavelet transform to generate compressed data.

7. An apparatus comprising:
   transceiver electronics to communicate with a wireless sensor network; and
   processor electronics configured to (i) control the transceiver electronics to transmit a first pilot signal using a local power level that controls a radio range of signals transmitted via the transceiver electronics, (ii) detect one or more nodes of the wireless sensor network based on a reception, via the transceiver electronics, of one or more second pilot signals from the one or more nodes of the wireless sensor network, (iii) control the transceiver electronics to transmit a local outdegree to the one or more detected nodes, the local outdegree being based on a quantity of detected nodes, (iv) receive, via the transceiver electronics, one or more remote outdegrees from the one or more detected nodes, (v) determine a local node type of the apparatus based on the local outdegree, the one or more remote outdegrees, and one or more detected node types corresponding to at least a portion of the one or more detected nodes, respectively, and (vi) adjust characteristics, including an energy usage characteristic and a data compression characteristic, of the network by selectively modifying the local power level and selectively changing the local node type.

8. The apparatus of claim 7, wherein the processor electronics are configured to (i) exchange messages with at least a portion of the detected nodes, the messages indicating a node type, (ii) selectively assign the local node type as a raw type based on information comprising the local outdegree, the one or more remote outdegrees, and one or more of the messages, and (iii) selectively assign the local node type as an aggregation type based on a neighbor node being of the raw type, wherein a node of the raw type sends raw data to a node of the aggregation type, wherein the node of the aggregation type aggregates and compresses raw data.

9. The apparatus of claim 7, wherein the first pilot signal comprises an indication of the local power level, wherein the one or more second pilot signals each comprise an indication of a power level, and wherein the processor electronics are configured to transmit an acknowledgement message based on a maximum power level indicated by the one or more received second pilot signals, and receive one or more acknowledgements from the one or more detected nodes.

10. The apparatus of claim 7, wherein the processor electronics are configured to (i) cause an increase of the local power level to increase the radio range to reach one or more additional nodes and (ii) control a transmission of an additional signal at the increased local power level to cause the one or more additional nodes to become an aggregation type, wherein the local node type is a raw type, wherein a node of the aggregation type aggregates and compresses raw data.

11. The apparatus of claim 10, wherein the node of the aggregation type is configured to perform a portion of a distributed wavelet transform to generate compressed data.

12. The apparatus of claim 7, wherein the processor electronics are configured to perform an approximation-based distributed minimum set cover modification algorithm to change one or more node type assignments within the network to increase a data compression ratio.

13. The apparatus of claim 12, wherein the approximation-based distributed minimum set cover modification algorithm includes increasing the local power level to increase the radio range to reach one or more additional nodes.

14. A system comprising:
   one or more first nodes, comprising first processor electronics and first transceiver electronics, configured to collect data, route data, or collect and route data within a wireless sensor network; and a second node, comprising second processor electronics and second transceiver electronics, configured to collect data, route data, or collect and route data within the wireless sensor network, wherein the second processor electronics are configured to perform operations comprising:

controlling the second transceiver electronics to transmit a first pilot signal using a local power level that controls a radio range of signals transmitted from the second node;

detecting one or more of the first nodes based on a reception, via the second transceiver electronics, of one or more second pilot signals from at least a portion of the first nodes;

controlling the second transceiver electronics to transmit a local outdegree, the local outdegree being based on a quantity of the one or more detected first nodes;

controlling the second transceiver electronics to receive one or more remote outdegrees from the one or more detected first nodes;

controlling the second transceiver electronics to exchange messages with at least a portion of the one or more detected first nodes, wherein the messages comprise an indication of a node type of a transmitting node, the node type being selected from a group comprising an aggregation type and a raw type, wherein a node of the raw type is configured to send raw data to a node of the aggregation type, wherein a node of the aggregation type is configured to aggregate and compress raw data;

determining the node type of the second node based on information comprising the local outdegree, the one or more remote outdegrees, and one or more of the messages; and adjusting characteristics, including an energy usage characteristic and a data compression characteristic, of the wireless sensor network by transmitting one or more additional messages based on (i) selectively modifying the local power level and (ii) selectively changing the node type of the second node.

15. The system of claim 14, wherein determining the node type of the second node comprises (i) detecting, via one or more of the messages, whether at least one of the detected first nodes is of the raw type, (ii) selectively assigning the node type of the second node as the raw type based on information comprising the local outdegree, the one or more remote outdegrees, and a lack of a detection that at least one of the detected first nodes is of the raw type, and (iii) selectively assigning the node type of the second node as an aggregation type based on a detection that at least one of the detected first nodes is of the raw type.

16. The system of claim 15, wherein the first pilot signal comprises an indication of the local power level, wherein the one or more received second pilot signals each comprise an indication of a power level, and wherein detecting the one or more of the first nodes comprises:

controlling the second transceiver electronics to transmit an acknowledgement message based on a maximum power level indicated by the one or more received second pilot signals; and controlling the second transceiver electronics to receive one or more acknowledgements from at least a portion of the first nodes.

17. The system of claim 15, wherein the node type of the second node is the raw type, and wherein adjusting the characteristics comprises:

increasing the local power level to increase the radio range to reach one or more additional nodes; and controlling the second transceiver electronics to transmit an additional signal at the increased local power level to cause at least a portion of the one or more additional nodes to become the aggregation type.

18. The system of claim 15, wherein the node of the aggregation type is configured to perform a portion of a distributed wavelet transform to generate compressed data.

19. The system of claim 14, wherein adjusting the characteristics comprises performing an approximation-based distributed minimum set cover modification algorithm to change one or more node type assignments of nodes within the system to increase a data compression ratio.

20. The system of claim 19, wherein performing the approximation-based distributed minimum set cover modification algorithm comprises increasing the local power level to increase the radio range to reach one or more additional nodes.

\* \* \* \* \*